(12) United States Patent
Singh

(10) Patent No.: US 12,461,977 B2
(45) Date of Patent: Nov. 4, 2025

(54) SYSTEMS AND METHODS FOR SELECTING SUPPLEMENTAL CONTENT FOR A USER BASED ON A HELPING USER'S BEHAVIOR

(71) Applicant: Adeia Guides Inc., San Jose, CA (US)

(72) Inventor: Mona Singh, Cary, NC (US)

(73) Assignee: Adeia Guides Inc., San Jose, CA (US)

(*) Notice: Subject to any disclaimer, the term of this patent is extended or adjusted under 35 U.S.C. 154(b) by 0 days.

(21) Appl. No.: 17/871,292

(22) Filed: Jul. 22, 2022

(65) Prior Publication Data
US 2024/0028653 A1 Jan. 25, 2024

(51) Int. Cl.
*G06F 16/9535* (2019.01)
*G06F 3/01* (2006.01)
*G06Q 30/0251* (2023.01)
*H04L 67/50* (2022.01)

(52) U.S. Cl.
CPC .......... *G06F 16/9535* (2019.01); *G06F 3/017* (2013.01); *G06Q 30/0255* (2013.01); *H04L 67/535* (2022.05)

(58) Field of Classification Search
CPC .................................................. G06F 16/9535
USPC ....................................................... 707/732
See application file for complete search history.

(56) References Cited

U.S. PATENT DOCUMENTS

| | | | | |
|---|---|---|---|---|
| 10,560,057 B1 * | 2/2020 | Fabrikant | ............... | G06F 9/451 |
| 11,412,011 B1 * | 8/2022 | Benjamin | ............... | H04L 67/02 |
| 2010/0315482 A1 * | 12/2010 | Rosenfeld | ............. | H04L 65/403 |
| | | | | 348/E7.083 |
| 2017/0006446 A1 * | 1/2017 | Harris | ................... | H04W 76/14 |
| 2018/0293281 A1 * | 10/2018 | Kim | ....................... | G06F 16/156 |
| 2019/0068526 A1 * | 2/2019 | Xie | ....................... | H04L 67/303 |
| 2019/0199761 A1 * | 6/2019 | Felman | .................. | H04L 67/55 |
| 2020/0051559 A1 * | 2/2020 | Park | .................. | G06F 16/90332 |
| 2022/0083538 A1 * | 3/2022 | Negulescu | ............ | G06F 3/0486 |

\* cited by examiner

*Primary Examiner* — Muluemebet Gurmu

(74) *Attorney, Agent, or Firm* — HALEY GUILIANO LLP

(57) ABSTRACT

Systems and methods for selecting supplemental content based on a conversation between a user and a helper are disclosed. The methods analyze a conversation, or other interactions, to determine the context and determine whether content discussed is associated with a product or service in the marketplace and of interest to the user. A factor-based determination is made whether to track helper's behavior and interactions after the conversation. When the helper is tracked, based on their tracing preferences, the helper's biometrics, such as gaze and/or heartbeat, are used to determine their interest in a product or service consumed, such as via media consumption, virtual reality experiences, or other online and offline interactions. Supplemental content related to helper's interested products are filtered based on user preferences and transmitted to the user. Knowledge trees associated with the supplemental content that include the basis for recommendation, source of knowledge, and other knowledge related details are provided for user access.

20 Claims, 21 Drawing Sheets

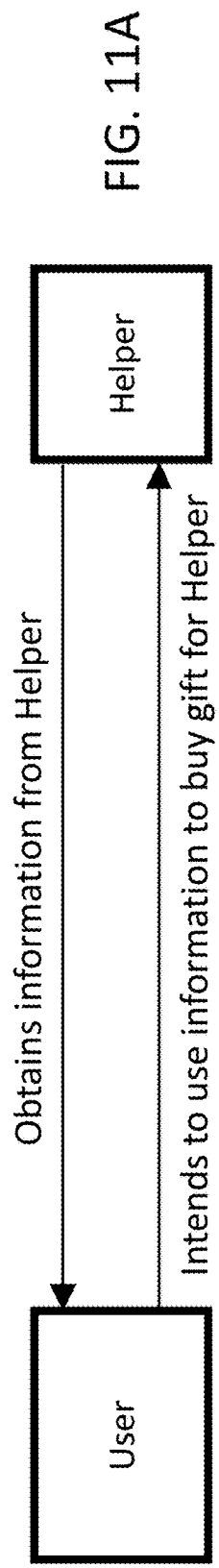
FIG. 11A
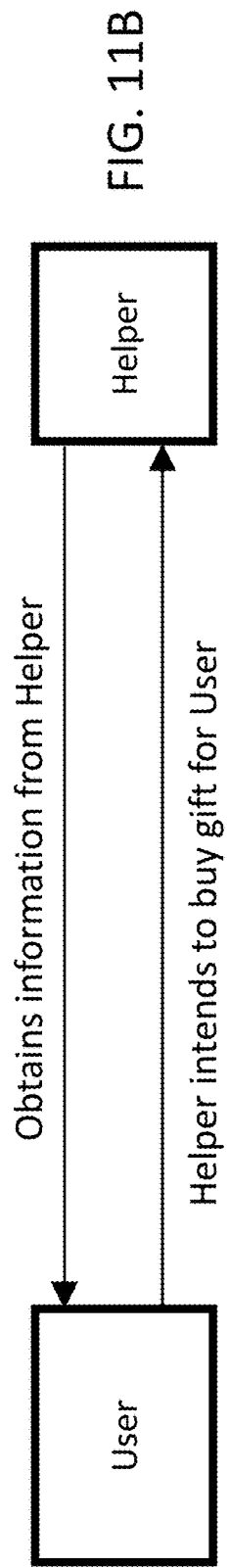
FIG. 11B
| Helper Share Settings | | | |
|---|---|---|---|
| No sharing | Limited sharing based on type of content | Sharing without identifying Helper | Full access sharing | No Settings |
| | | | | Use machine learning data |
FIG. 11C

| Who | What |
|---|---|
| User | A daughter brings up her interest in trying some high-quality loose leaf Jasmine tea while studying for her exams at college |
| System | The daughter's or father's device notices the topic as being a product family (special teas) |
| Helping user | Not long after the conversation, the father remembers some special teas he had tried on his travels or when he was younger |
| Helping user | He searches a little for the fancier teas. The Taiwanese Ali Shan Oolong tea was one of his favorites. When he sees it turn up on one of the web pages he visits, his eyes light up, and he looks at the posted images with interest |
| System | The father's device detects the father's interest and ties it to the topic of the previous conversation |
| User | A short while later, the daughter is on social media |
| System | Her browser displays SC for Ali Shan Oolong tea |
| User | The daughter hadn't thought of Oolong teas, but she notices that a caffeinated tea may be better for her studies and decides to try it |

FIG. 18

| Who | What |
|---|---|
| User | Felix: "Just took my car for its safety inspection today; 17 years ... it's not going to last much longer without heavy repairs; I don't want to buy a gas car, though" |
| Helping user | Walter: "Maybe you need to get an EV then!" |
| User | Felix: "Not sure I can afford a 100k car, and I worry about the battery range" |
| | ... And so on ... |
| System | Felix or Walter's device notices the topic as being a product family (EVs) |
| Helping user | Walter sees a BMW plug-in hybrid X5 SUV on the street. It catches his eye because he was talking to Felix about cars, and here's one that is below 100k and doesn't have the range problems of EVs |
| System | Walter's device detects Walter's interest in the plug-in hybrid X5 and ties it to the topic of the previous conversation |
| User | Felix is driving to the grocery store and sees a Tesla Model X SUV |
| System | Felix's device displays SC for the BMW plug-in hybrid X5 |
| User | Felix hadn't given serious thought to plug-in hybrids but begins to see they may match his needs concerning battery range |

FIG. 19

SYSTEMS AND METHODS FOR SELECTING SUPPLEMENTAL CONTENT FOR A USER BASED ON A HELPING USER'S BEHAVIOR

FIELD OF DISCLOSURE

Embodiments of the present disclosure relate to providing supplemental content to a user that is related to communications between the user and a helper and selected based on tracking the helper's behavior and interactions.

BACKGROUND

Marketing today is not what it used to be even just a few years ago. Growth in online sales has given rise to a variety of ever-more-exactly targeted approaches aimed at developing successful marketing and advertising campaigns to reach consumers. Advertisers use search engine optimizations, leverage referral marketing, and track user behavior based on browsing habits, to name a few approaches. Some systems may also "listen in" on people to determine exactly what products to suggest in an attempt to provide advertisements for products and services that closely match your product or service offerings.

Advertisements are most effective when they draw a user's attention to products that the user would consider purchasing. In most cases where ads are valuable, the user would not have finalized their decision on what to purchase or even shortlisted choices. In those cases, an ad can bring a relevant product to the user's attention in time to influence the user's decision.

Search engine-generated recommendations have long been identified as an effective basis on which a user may choose relevant products given their interests, especially as those interests may be reflected in the user's browsing and search history. Well-known examples of search engine recommendation engines are Amazon and Netflix. Thus, we can think of the best ads for a user as recommendations for relevant products that are commercially available. In other words, the choice of an ad can be seen as a recommendation that is further filtered based on a revenue source associated with a product offering. But at its core, an ad is a recommendation.

Two of several problems with using the search engine recommendation approach to filter and provide an ad are that such approaches a) only look at the user's past history, i.e., look in the rearview mirror to predict a product they may want in the future and b) do not bring any new knowledge that can be useful in determining the most relevant ad.

In terms of looking at a user's past history, current approaches select ads by ad words corresponding to certain products, including competitors' products. When the user searches for one of the matching words, the company's ads may be selected for display to the user. But these ads are not specifically based on the user's current needs; they only look at what the user may have browsed in the past to determine, or rather assume, that the user's current needs have not changed.

In terms of not leveraging new knowledge, even if the user's current needs have not changed, the approaches do not determine what is the best product for the user based on their needs and simply serve ads that fit the ad words profile. Methods do not exist to properly ascertain what is the best product for the user because such methods may require asking the user what is best for them and interfering with their user experience, and even if asked, the user may not know what is out in the marketplace or the best product fit for their needs.

As such, there is a need for a method to solve some of the problems addressed above that takes a forward-looking approach, instead of looking in the rearview mirror, and leverages new knowledge to select and transmit ads that are relevant and best suited for the user.

BRIEF DESCRIPTION OF THE FIGURES

The various objects and advantages of the disclosure will be apparent upon consideration of the following detailed description, taken in conjunction with the accompanying drawings, in which like reference characters refer to like parts throughout, and in which:

FIGS. 11A-11C is an example of a communication between a user and a helper in which the user or helper intends to purchase a product or service for the other, in accordance with some embodiments of the disclosure;

FIGS. 18-19 are examples of discussion between a user and helper and the system's supplemental content recommendations based on the discussion, in accordance with some embodiments of the disclosure.

DETAILED DESCRIPTION

Figure 1:
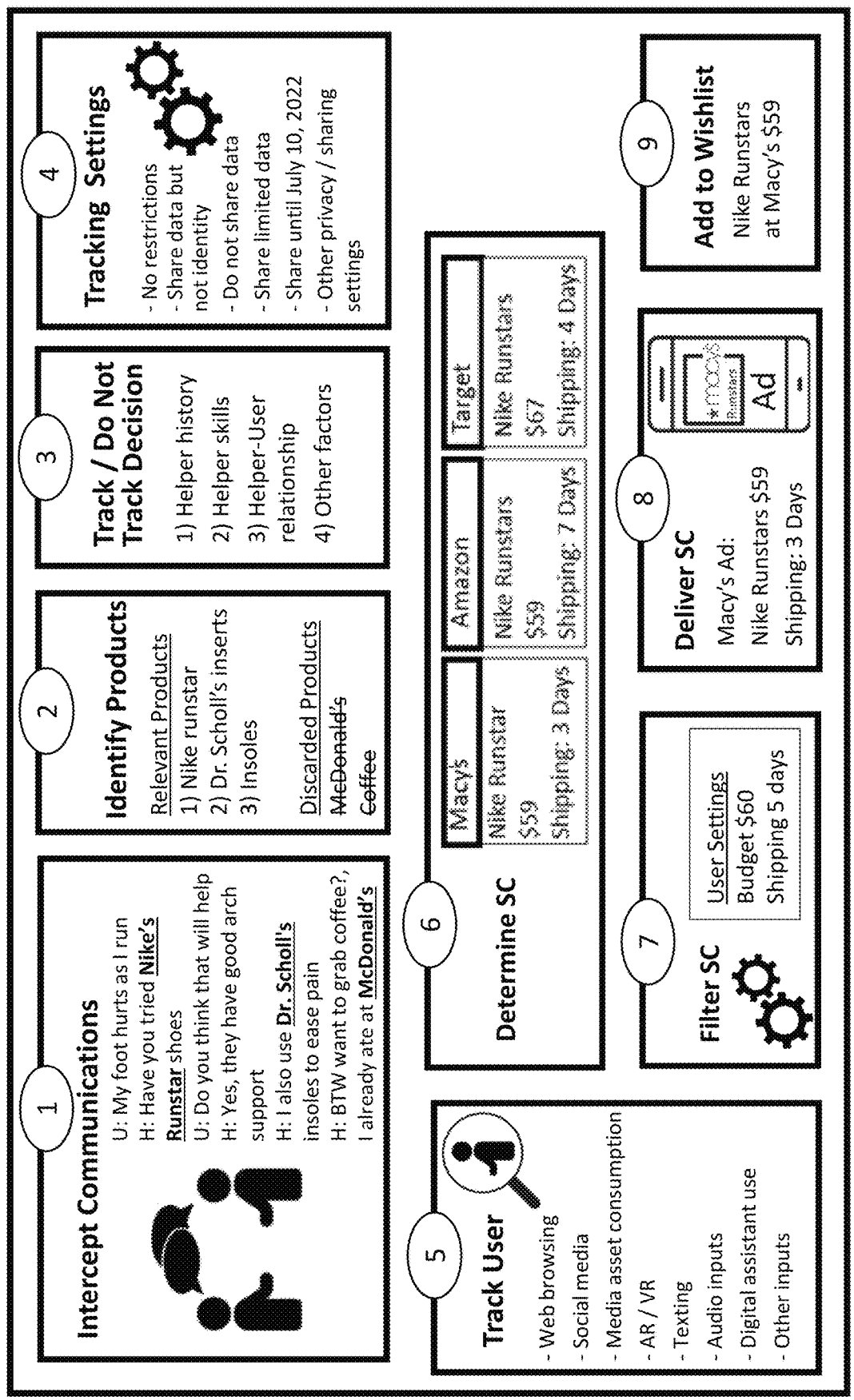
FIG. 1 is a block diagram of an example of a process for determining supplemental content for display on a user device based on a helper's interactions that follow a user-helper communication, in accordance with some embodiments of the disclosure.

In accordance with some embodiments disclosed herein, some of the above-mentioned limitations are overcome by receiving an input of a communication between a user and a helper, determining that the communication relates to subject matter that is relevant and of interest to the user, tracking the helper's interactions to identify a product or service that is related to the user's interest, i.e., by leveraging the helper's knowledge and insights, and displaying, on a display device associated with the user, supplemental content related to the product or service that was determined utilizing the helper's knowledge and insights and that is of interest to the helper. As referred to herein, supplemental content includes additional content, such as an advertisement, infomercial, commercial, video or media asset, audio file, webpage, online book, online resources, purchasing options for a product or service of interest.

Also as referred to herein, subject matter that is relevant and of interest to the helper is a product or service that is being offered for sale in the marketplace. The product or service (subject matter) of interest to the helper may also be referred to as the second subject matter.

Also as referred to herein, subject matter that is relevant and of interest to the user is a product or service that is being offered for sale in the marketplace. The product or service (subject matter) of interest to the user may also be referred to as the first subject matter.

To accomplish some of these embodiments, a communication between a user and a helper is captured. The system determines whether the captured communication includes references to products or services that may be of interest to the user. If the communication mentions a product or service specifically, or generally mentions words, phrases, or names that can be related to products or services, the system determines if such products or services are of interest to the user and sold in the marketplace. A variety of processes and algorithms may be executed, such as natural language processing, artificial intelligence, and machine learning algorithms, to determine if the communication relates to a product or service that is of interest to the user. For example, the processes may determine the context of the communication and parse words, phrases, and names mentioned in the communication to determine if they are related to the context and if they can be associated with products and services. The system may also determine if the products or services discussed in the communication relate to an actual product or service that is being offered for sale in the marketplace.

The system determines whether to track the helper who was engaged in the communication with the user. Applicability of factors relating to the helper may be analyzed to determine whether to track the helper. These factors may include the relationship of the helper to the user, the helper's background, and the helper's experience or expertise with the products or services mentioned in the communication. The system may determine if the helper has any privacy or sharing settings in place prior to tracking the helper.

Once tracking is enabled, the system may track the helper's behavior and future interactions that relate to the products or services derived from the communication between the user and the helper. The helper's interactions such as consuming a media asset on a media device, browsing on the Internet, posting or commenting on social media platforms, using a virtual reality headset to view real and virtual objects, and other interactions, may be examined to determine if the helper is interested in the product or service. The helper's gaze, heartbeat, motion may be used as indicators of interest.

Upon determining the helper's interest in a particular product or service, the system may obtain available supplemental content for such products and services. The system may then determine if the user has any preferences for the types of products they prefer. In the absence of any setting, the system may automatically apply a setting based on the type of genre of the product, or the system may execute a machine learning algorithm to determine the user's past preferences.

Applying the preferences, the system may filter available supplemental content and select one or more pieces of supplemental content to transmit to the user. The system may also record the product related to the supplemental content in a wish list for the user for later purchase. Additionally, the system may provide a knowledge tree that includes information relating to the product, the helper who identified the product and the platforms used by the helper in determining the product.

FIG. 1 is a block diagram of an example of a process for determining supplemental content for display on a user device based on helper's interactions that follow a user-helper communication, in accordance with some embodiments of the disclosure.

In one embodiment, at block 1, a user and a helper engage in a conversation. Although the parties to the conversation are referred to as a user and a helper, they may also be referred to as a first user and a second user (helper). The user may be referred to as the user, and the helper may be referred to as the potential helper or helper. The conversation may be live, real-time, and in person, where the user and the helper are engaged in a discussion as displayed in block 1. The conversation may also occur on other platforms, such as via text, phone call, video conference, email, or on a social media platform. The conversation may be between two individuals, or the conversation may be between an individual and a smart device, such as a digital assistant.

As depicted in block 1, the user, identified by the letter "U," (also referred to as first user) is discussing with the helper, identified by the letter "H," (also referred to as second user) the fact that the user's foot hurts when they run. In response, the helper is offering some advice on the type of shoes to wear and the type of inserts to put inside the shoes to ease the pain during running. At the end of the conversation, unrelated to the context of the topic, which relates to the user's foot hurting while they are running, the helper casually asks if the user wants to grab some coffee because the helper has already eaten at McDonald's®.

In one embodiment, at block 1, a system listening to the conversation may extract words or phrases that relate to products or services. The system may then determine the relevance of the products and services to the context of the conversation. Since the context of the conversation relates to the user's foot hurting while running and in response the helper offering advice of the type of shoes and inserts to wear to ease the pain, the system may determine that Nike Runstar shoes and Dr. Scholl's™ inserts are products that are relevant to the context of the conversation.

The system may also determine that although McDonald's, a restaurant that serves fast food, and coffee were mentioned, both of which may relate to some products, since such references are not related to the context of the conversation, the system may discard them or otherwise not use them for further tracking or analysis. For example, the system may utilize any one or more of an artificial intelligence (AI) engine, a machine learning (ML) engine and an natural language processing (NLP) engine to execute any one or more of AI, ML, and NLP algorithms to determine what products are of interest to the user. For example, the using these algorithms the system may determine what excites a user, such as based on the user's expressions, voice tone, heartbeat, blood pressure etc. measured through wearable devices, or what is of interest to the user based on their consumption history.

In one embodiment, at block 2, the system may identify products that are relevant, such as Nike Runstar and Dr. Scholl's™ inserts, and identify products that are not relevant. In another embodiment, the system may only identify products that are relevant to the conversation as the products that are likely of interest to the user.

In another embodiment, the end of the conversation may have been different. For example, the helper may have said, "BTW want to grab coffee? I already ate at McDonald's," and the user may have responded "I am always in search of unique coffees, but not now." Based on this dialogue, the system would determine that, although the mention of coffee does not relate to the main concept of the user's foot hurting while running, the user expressed some interest in learning about unique types of coffees. As such, the system may identify coffee as a relevant category of products that would be of interest to the user for tracking purposes.

In one embodiment, the system may use natural language processing (NLP) and artificial intelligence (AI), and/or machine learning (ML) engines and algorithms to process a conversation and determine the context and the relationship between products or categories of products mentioned during the conversation and the context. For example, an NLP engine may execute an NLP algorithm to extract words from a conversation that relate to products. The words extracted may be fed into an AI engine that executes an AI algorithm to determine the relationship of the words to the context of the conversation. The AI engine may also determine the context or multiple contexts and sub-contexts from the conversation.

In one embodiment, the AI engine may execute the AI algorithm to determine whether the extracted words relating to products or services are of interest to the user. The AI engine may analyze a variety of factors, e.g., excitement when uttering such words, volume of the user's voice, words of interest, etc., to determine if the extracted words that relate to a product or service are of interest to the user. In another embodiment, the AI engine may feed the extracted words that relate to products or services into a machine learning (ML) engine that executes a machine learning algorithm to determine if their products were of interest to the user based on prior conversations. The products may be indicated as relevant based on analysis performed, in one embodiment, from such NLP, AI, and/or ML engines.

At block 3, once relevant products or services have been identified, i.e., products or services that are deemed of interest to the user based on analysis of the conversation between the user and the helper, then the system determines whether to track future interactions of the helper. In one embodiment, the system automatically tracks a helper once relevant products in the conversation have been identified, such as at block 2.

In another embodiment, the system analyzes a plurality of factors related to the helper to determine whether to track the helper's future interactions. The analysis is performed to determine if the helper would in fact actually be helpful in suggesting products or services based on their implicit world knowledge of the products or services discussed during the conversation that were deemed relevant at block 2. Tapping into the helper's implicit knowledge as well as perhaps their understanding of the user's needs, based on their relationship with the user, provides the system with a new source of knowledge about the user. This new source is absent from approaches that simply use behavior and crawl for words to determine and suggest products for purchase. By mining the helper's knowledge, with no explicit action by any user, the system is able to improve the user experience with supplemental content. It is also able to increase ad revenue while avoiding any disruption of the user experience, by providing relevant and targeted ads to the user that may come from a source (such as the helper) that knows the user's likes and dislikes.

Some of the factors analyzed in determining whether to track the helper include a) the helper's consumption history, b) the helper's skills, c) the helper-user relationship, d) the helper's ownership of products or services related to the products or services identified as relevant in block 2, e) the helper's expertise, and/or f) the helper's job or educational background. Association between the user and helper, such as type of relationship, and other factors as described below may also be examined to determine whether to track the helper. Additional details relating to whether to track a helper are further described through discussion of FIG. 9.

In one embodiment, the system may track the helper's future interactions without performing an analysis of the helper's background or analysis of any of the factors relating to the helper. In another embodiment, the system may perform an analysis of one or more factors, as mentioned above. One of the many reasons to perform an analysis prior to tracking the helper is to make sure that the helper is in fact qualified or possesses some implicit knowledge or has had some experiences with products or services that may be of interest to the user. Doing such an analysis prevents tracking of every person with whom the user may communicate. Some such people that may not be of help to the user or may be people with whom the user does not have any relationship, such as unknown or not well-known Twitter or other social media followers.

At block 4, the system may check the helper's profile or settings to determine if the helper has any restrictions or limitations on sharing their interactions that occur subsequent to the conversation with the user or any restrictions on sharing their identity. In some embodiments, the helper may have set preferences in their profile that relate to allowing or restricting the sharing of their interactions. As depicted in block 4, these preferences may include no restrictions, share data but not identity, do not share data, share limited data, share interactions until a specific date or a particular event, or some other privacy or sharing settings.

In another embodiment, the helper may not have set their preferences in terms of sharing or privacy. In such circumstances, a machine learning engine may execute a machine learning algorithm to analyze the helper's prior conversations or consumption history to determine if the helper has either restricted, made any comments, or performed any actions that may indicate the helper's sharing and privacy preferences. If such prior data is found, the machine learning algorithm may identify such data so that it can be complied with, prior to tracking the helper. In yet another embodiment, the system may display a prompt or some other type of message to the helper asking the helper's permission to disclose their identity or access their future interactions.

At block 5, the system may track interactions of the helper. These may include the helper's interaction relating to web browsing; social media; media asset consumption; virtual, augmented, or mixed reality device usage; texting; audio inputs through a variety of means, including an audio input into a mobile phone while talking in real time to a live person; digital assistant use; and any other inputs through which voice, video, or data can be obtained. For example, subsequent to the conversation with the user, if the helper browses the Internet for Nike Runstar shoes or Dr. Scholl's™ inserts and navigates to webpages with different models or releases of those products, then such web browsing interactions may be captured by the system as related to the products or genres identified at block 2.

At block 6, the system obtains data from all helper interactions that a) occur subsequent to the conversation with the user and b) are related to the products identified in block 2, i.e., products or services of interest to the user. Based on the data, the system may identify one or more specific products that are available for sale in a physical or an online store or through a service. The system may provide data relating to the identified one or more specific products to supplemental content server for further processing. In one embodiment, the system may include its own advertising server, and in another, the advertising server may be communicatively connected to the system, such as through the Internet.

In one embodiment, the supplemental content server may access one or more pieces of supplemental content related to the identified one or more specific products that were identified based on the helper's interactions. For example, if the helper's interactions relate to a model or version of the Nike Runstar shoes, and the system determines that the helper has shown interest in the product, then the system may access pieces of supplemental content from one or more stores or online platforms that sell that specific model or version of the Nike Runstar shoes. For example, as depicted in block 6, the system identified three platforms where the Nike Runstar shoes are sold. The system may then determine if supplemental content is available for the Nike Runstar shoes from the identified platforms. If supplemental content does not exist for any of the three platforms, then the system may access supplemental content that is available. In another embodiment, the system may request supplemental content to be generated.

At block 7, the system may determine if the user has set any preferences for receiving ads or purchasing. In one embodiment, the user may have set preferences in their profile on what type of ads are preferred and what type of ads are not preferred. In another embodiment, the user may not have set their preferences for types of ads preferred or not of interest. In such circumstances, a machine learning engine may execute a machine learning algorithm to analyze the user's prior purchase history or prior interactions. If such prior data is found, the machine learning algorithm may identify such data so that it could be used in determining whether the user would likely prefer or not prefer a given piece of supplemental content.

As depicted in block 7, in one example, the user preferences for products include a budget of $60 and a shipping period of five days or fewer. Although not shown here, the user may set any other preferences, such as types of stores, reviews of the product, or store location within a certain distance of their home, in their preferences for products and supplemental content related to such products.

At block 8, the system may filter supplemental content listed in block 6 based on the user settings provided in block 7. As such, since only the product sold by Macy's fits the user settings of a) price point under $60 and b) shipping duration of five days or fewer, the system may then transmit the Macy's advertisement or supplemental content that includes the Nike Runstar shoes details to the user's electronic device, such as a mobile phone.

In some embodiments, at block 9, the system may add the Nike Runstar shoes sold by Macy's to the user's wishlist. The user may set preferences in their profile as to whether they allow the system to add products to their wishlist.

The process of FIG. 1 (and FIG. 6) is applicable to several use cases, including media asset consumption. For example, in one embodiment, a user (Ursula) has a conversation with a friend about wanting to see some good documentaries about the Portuguese-Ottoman war as she is planning to visit Portugal soon. The friend (Fred) is a history buff and quickly rattles off a few suggestions. The system captures the communications (e.g., at block 1) through a variety of means, such as through a microphone, video camera, phone call or a virtual conference call, and IoT devices capable of receiving an input of the conversation. The system identifies that the category of discussion between Fred and Ursula relates to Portugal and to Portuguese-Ottoman war (e.g., at block 2). The system then determines that Fred's responses were relevant and decides to track Fred's interaction following his discussion with Ursula. As the system continues to track Fred, the system captured Fred's interactions (e.g., at block 5). The system notices that, once done with the conversation, which may be a phone call or live in-person talk, Fred consumed a BBC (British Broadcasting Corporation)™ series on the topic. The system determines the consumed BBC content to be relevant and performed steps disclosed in relation to blocks 6-8, and optionally block 9, to provide supplemental content on Ursula's electronic device that relates to the BBC series. Among several benefits from the approach include the system performing processes disclosed in FIG. 1 without any user/helper intervention, i.e., the helper can go about their routine and interact with any medium (e.g., at block 5), and the system automatically processes the data to make a related supplemental content available to the user. As such, in this example, Fred makes a mental note to let Ursula know about the BBC series but forgets to do so, and the system automatically performs the various processes without any intervention from Fred and provides the supplemental content for the BBC series to Ursula.

Figure 2:
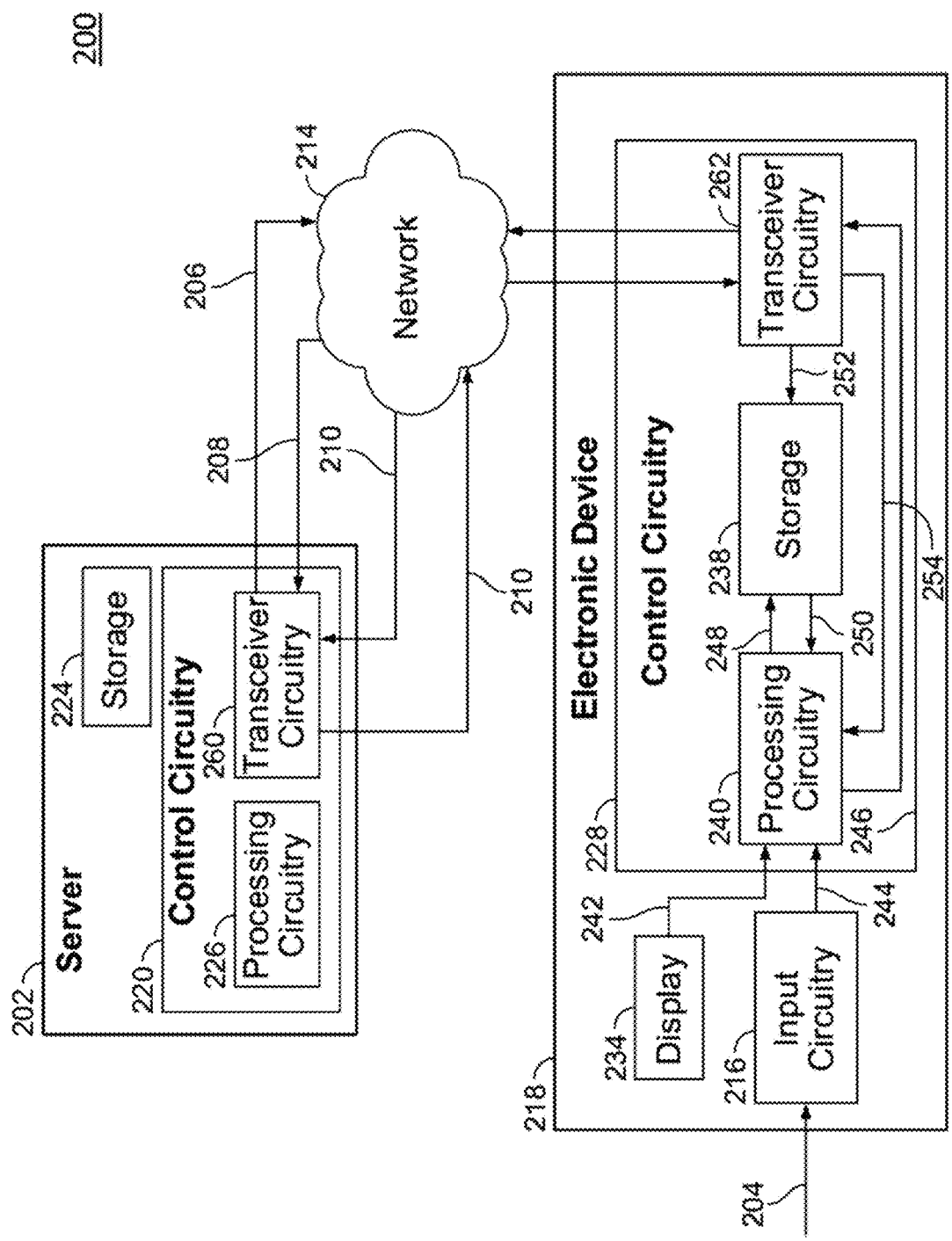
FIG. 2 is a block diagram of an example system for displaying supplemental content, in accordance with some embodiments of the disclosure.
Figure 3:
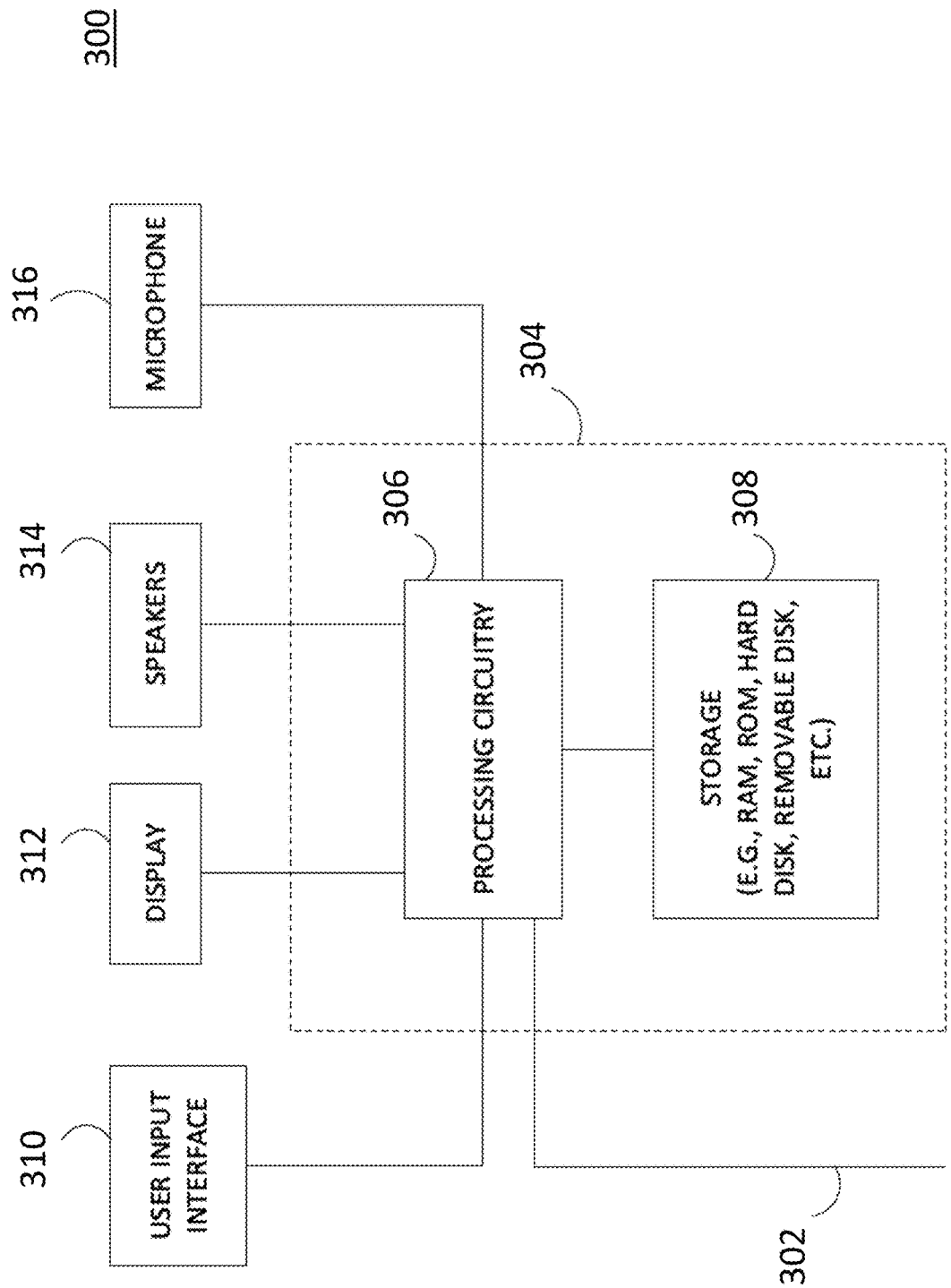
FIG. 3 is a block diagram of various components of a system for implementing the processes described herein, in accordance with some embodiments of the disclosure.

FIG. 2 is a block diagram of an example system for selecting supplemental content based on a conversation between a user and a helper and subsequently tracking of the helper's interactions, in accordance with some embodiments of the disclosure and FIG. 3 is a block diagram of a generalized electronic device, in accordance with some embodiments of the disclosure. FIGS. 2 and 3 also describe example devices, systems, servers, and related hardware that may be used to implement processes, functions, and functionalities described in relation to FIGS. 1, 5-7, 11*a*-11*c*, 16, and 20-21. Further, FIGS. 2 and 3 may also be used to detect a conversation between user and a helper, determine if the conversation relates to products and services, generating context of the conversation, determine if the products and services are of interest to the user, determine if the products and services can be related to products and services that are available in the marketplace for sale, determine if a helper who is part of the user-helper communication should be tracked, analyzing a plurality of factors to make the determination to track the helper, determining if the helper has any privacy and sharing setting and if so applying those setting prior to tracking the helper, determining the helper's interest in a product or service based on their biometric data, gathering the biometric data, determining if supplemental content is available for products and services that are of interest to the helper, determining if the user has any preferences for products and related supplemental content, applying any user preferences to filter the supplemental content, transmitting the supplemental content, adding the products and services to a wishlist, generating knowledge trees, and implementing and executing natural language, machine language, and artificial intelligence algorithms to make decision on selecting supplemental content.

In some embodiments, one or more parts of, or the entirety of system 200, may be configured as a system implementing various features, processes, functionalities and components of FIGS. 1, 5-7, and 16-17. Although FIG. 2 shows a certain number of components, in various examples, system 200 may include fewer than the illustrated number of components and/or multiples of one or more of the illustrated number of components.

System 200 is shown to include a computing device 218, a server 202 and a communication network 214. It is understood that while a single instance of a component may be shown and described relative to FIG. 2, additional instances of the component may be employed. For example, server 202 may include, or may be incorporated in, more than one server. Similarly, communication network 214 may include, or may be incorporated in, more than one communication network. Server 202 is shown communicatively coupled to computing device 218 through communication network 214. While not shown in FIG. 2, server 202 may be directly communicatively coupled to computing device 218, for example, in a system absent or bypassing communication network 214.

Communication network 214 may comprise one or more network systems, such as, without limitation, an Internet, LAN, WIFI or other network systems suitable for audio processing applications. In some embodiments, system 200 excludes server 202, and functionality that would otherwise be implemented by server 202 is instead implemented by other components of system 200, such as one or more components of communication network 214. In still other embodiments, server 202 works in conjunction with one or more components of communication network 214 to implement certain functionality described herein in a distributed or cooperative manner. Similarly, in some embodiments, system 200 excludes computing device 218, and functionality that would otherwise be implemented by computing device 218 is instead implemented by other components of system 200, such as one or more components of communication network 214 or server 202 or a combination. In still other embodiments, computing device 218 works in conjunction with one or more components of communication network 214 or server 202 to implement certain functionality described herein in a distributed or cooperative manner.

Computing device 218 includes control circuitry 228, display 234 and input circuitry 216. Control circuitry 228 in turn includes transceiver circuitry 262, storage 238 and processing circuitry 240. In some embodiments, computing device 218 or control circuitry 228 may be configured as media device 300 of FIG. 3.

Server 202 includes control circuitry 220 and storage 224. Each of storages 224 and 238 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 4D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 224, 238 may be used to store various types of content, metadata, and or other types of data (e.g., they can be used to store user and helper preferences, privacy and sharing preferences, knowledge trees, identifiers for interested products and services, machine learning data, consumption histories, and NLP, ML, and AI algorithms). Non-volatile memory may also be used (e.g., to launch a boot-up routine and other instructions). Cloud-based storage may be used to supplement storages 224, 238 or instead of storages 224, 238. In some embodiments, data relating to detect a conversation between user and a helper, determine if the conversation relates to products and services, generating context of the conversation, determine if the products and services are of interest to the user, determine if the products and services can be related to products and services that are available in the marketplace for sale, determine if a helper who is part of the user-helper communication should be tracked, analyzing a plurality of factors to make the determination to track the helper, determining if the helper has any privacy and sharing setting and if so applying those setting prior to tracking the helper, determining the helper's interest in a product or service based on their biometric data, gathering the biometric data, determining if supplemental content is available for products and services that are of interest to the helper, determining if the user has any preferences for products and related supplemental content, applying any user preferences to filter the supplemental content, transmitting the supplemental content, adding the products and services to a wishlist, generating knowledge trees, and implementing and executing natural language, machine language, and artificial intelligence algorithms to make decision on selecting supplemental content may be recorded and stored in one or more of storages 212, 238.

In some embodiments, control circuitry 220 and/or 228 executes instructions for an application stored in memory (e.g., storage 224 and/or storage 238). Specifically, control circuitry 220 and/or 228 may be instructed by the application to perform the functions discussed herein. In some implementations, any action performed by control circuitry 220 and/or 228 may be based on instructions received from the application. For example, the application may be implemented as software or a set of executable instructions that may be stored in storage 224 and/or 238 and executed by control circuitry 220 and/or 228. In some embodiments, the application may be a client/server application where only a client application resides on computing device 218, and a server application resides on server 202.

The application may be implemented using any suitable architecture. For example, it may be a stand-alone application wholly implemented on computing device 218. In such an approach, instructions for the application are stored locally (e.g., in storage 238), and data for use by the application is downloaded on a periodic basis (e.g., from an out-of-band feed, from an Internet resource, or using another suitable approach). Control circuitry 228 may retrieve instructions for the application from storage 238 and process the instructions to perform the functionality described herein. Based on the processed instructions, control circuitry 228 may determine a type of action to perform in response to input received from input circuitry 216 or from communication network 214. For example, in response to determining that a conversation relates to a product or service that is of interest to the user, the control circuitry 228 may perform the steps of process described in FIGS. 1, 5-7, 11a-11c, 16, and 20-21 below and all the steps and processes described in all the figures depicted herein.

In client/server-based embodiments, control circuitry 228 may include communication circuitry suitable for communicating with an application server (e.g., server 202) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 214). In another example of a client/server-based application, control circuitry 228 runs a web browser that interprets web pages provided by a remote server (e.g., server 202). For example, the remote server may store the instructions for the application in a storage device. The remote server may process the stored instructions using circuitry (e.g., control circuitry 228) and/or generate displays. Computing device 218 may receive the displays generated by the remote server and may display the content of the displays locally via display 234. This way, the processing of the instructions is performed remotely (e.g., by server 202) while the resulting displays, such as the display windows described elsewhere herein, are provided locally on computing device 218. Computing device 218 may receive inputs from the user via input circuitry 216 and transmit those inputs to the remote server for processing and generating the corresponding displays. Alternatively, computing device 218 may receive inputs from the user via input circuitry 216 and process and display the received inputs locally, by control circuitry 228 and display 234, respectively.

Server 202 and computing device 218 may transmit and receive content and data such as objects, frames, snippets of interest, and input from primary devices and secondary devices, such as AR devices. Control circuitry 220, 228 may send and receive commands, requests, and other suitable data through communication network 214 using transceiver circuitry 260, 262, respectively. Control circuitry 220, 228 may communicate directly with each other using transceiver circuits 260, 262, respectively, avoiding communication network 214.

It is understood that computing device 218 is not limited to the embodiments and methods shown and described herein. In nonlimiting examples, computing device 218 may be a primary device, a personal computer (PC), a laptop computer, a tablet computer, a WebTV box, a personal computer television (PC/TV), a PC media server, a PC media center, a handheld computer, a mobile telephone, a smartphone, a virtual, augment, or mixed reality device, or a device that can perform function in the metaverse, or any other device, computing equipment, or wireless device, and/or combination of the same capable of suitably displaying primary content and secondary content.

Control circuitry 220 and/or 218 may be based on any suitable processing circuitry such as processing circuitry 226 and/or 240, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 220 and/or control circuitry 218 are configured to detect a conversation between user and a helper, determine if the conversation relates to products and services, generating context of the conversation, determine if the products and services are of interest to the user, determine if the products and services can be related to products and services that are available in the marketplace for sale, determine if a helper who is part of the user-helper communication should be tracked, analyzing a plurality of factors to make the determination to track the helper, determining if the helper has any privacy and sharing setting and if so applying those setting prior to tracking the helper, determining the helper's interest in a product or service based on their biometric data, gathering the biometric data, determining if supplemental content is available for products and services that are of interest to the helper, determining if the user has any preferences for products and related supplemental content, applying any user preferences to filter the supplemental content, transmitting the supplemental content, adding the products and services to a wishlist, generating knowledge trees, and implementing and executing natural language, machine language, and artificial intelligence algorithms to make decision on selecting supplemental content and perform all processes described and shown in connection with FIGS. 1, 5-7, 11a-11c, 16, and 20-21.

Computing device 218 receives a user input 204 at input circuitry 216. For example, computing device 218 may receive a user input like user's gaze, user's heartbeat, user's motion, or some other user engagement with the primary content.

User input 204 may be received from Internet browsing, virtual, augmented or mixed reality headsets, mobile data, social media platforms, SMS, digital assistants, or emails. Transmission of user input 204 to computing device 218 may be accomplished using a wired connection, such as an audio cable, USB cable, ethernet cable or the like attached to a corresponding input port at a local device, or may be accomplished using a wireless connection, such as Bluetooth, WIFI, WiMAX, GSM, UTMS, CDMA, TDMA, 3G, 4G, 4G LTE, or any other suitable wireless transmission protocol. Input circuitry 216 may comprise a physical input port such as a 3.5 mm audio jack, RCA audio jack, USB port, ethernet port, or any other suitable connection for receiving audio over a wired connection or may comprise a wireless receiver configured to receive data via Bluetooth, WIFI, WiMAX, GSM, UTMS, CDMA, TDMA, 3G, 4G, 4G LTE, or other wireless transmission protocols.

Processing circuitry 240 may receive input 204 from input circuit 216. Processing circuitry 240 may convert or translate the received user input 204 that may be in the form of voice input into a microphone, or movement or gestures to digital signals. In some embodiments, input circuit 216 performs the translation to digital signals. In some embodiments, processing circuitry 240 (or processing circuitry 226, as the case may be) carries out disclosed processes and methods. For example, processing circuitry 240 or processing circuitry 226 may perform processes as described in FIGS. 1 and 6, respectively.

FIG. 3 shows a generalized embodiment of an electronic equipment device 300, in accordance with one embodiment. In an embodiment, the equipment device 300, is the same equipment device 202 of FIG. 2. The equipment device 300 may receive content and data via input/output (I/O) path 302. The I/O path 302 may provide audio content (e.g., broadcast programming, on-demand programming, Internet content, content available over a local area network (LAN) or wide area network (WAN), and/or other content) and data to control circuitry 304, which includes processing circuitry 306 and a storage 308. The control circuitry 304 may be used to send and receive commands, requests, and other suitable data using the I/O path 302. The I/O path 302 may connect the control circuitry 304 (and specifically the processing circuitry 306) to one or more communications paths. I/O functions may be provided by one or more of these communications paths but are shown as a single path in FIG. 3 to avoid overcomplicating the drawing.

The control circuitry 304 may be based on any suitable processing circuitry such as the processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

The communications between two separate user devices, such as the primary device and the secondary device, to detect a conversation between user and a helper, determine if the conversation relates to products and services, generating context of the conversation, determine if the products and services are of interest to the user, determine if the products and services can be related to products and services that are available in the marketplace for sale, determine if a helper who is part of the user-helper communication should be tracked, analyzing a plurality of factors to make the determination to track the helper, determining if the helper has any privacy and sharing setting and if so applying those setting prior to tracking the helper, determining the helper's interest in a product or service based on their biometric data, gathering the biometric data, determining if supplemental content is available for products and services that are of interest to the helper, determining if the user has any preferences for products and related supplemental content, applying any user preferences to filter the supplemental content, transmitting the supplemental content, adding the products and services to a wishlist, generating knowledge trees, and implementing and executing natural language, machine language, and artificial intelligence algorithms to make decision on selecting supplemental content and all the functionalities discussed associated with the figures mentioned in this application can be at least partially implemented using the control circuitry 304. The processes as described herein may be implemented in or supported by any suitable software, hardware, or combination thereof. They may also be implemented on user equipment, on remote servers, or across both.

In client-server-based embodiments, the control circuitry 304 may include communications circuitry suitable for allowing communications between two separate user devices to detect a conversation between user and a helper, determine if the conversation relates to products and services, generating context of the conversation, determine if the products and services are of interest to the user, determine if the products and services can be related to products and services that are available in the marketplace for sale, determine if a helper who is part of the user-helper communication should be tracked, analyzing a plurality of factors to make the determination to track the helper, determining if the helper has any privacy and sharing setting and if so applying those setting prior to tracking the helper, determining the helper's interest in a product or service based on their biometric data, gathering the biometric data, determining if supplemental content is available for products and services that are of interest to the helper, determining if the user has any preferences for products and related supplemental content, applying any user preferences to filter the supplemental content, transmitting the supplemental content, adding the products and services to a wishlist, generating knowledge trees, and implementing and executing natural language, machine language, and artificial intelligence algorithms to make decision on selecting supplemental content and all related functions and processes as described herein. The instructions for carrying out the above-mentioned functionality may be stored on one or more servers. Communications circuitry may include a cable modem, an integrated service digital network (ISDN) modem, a digital subscriber line (DSL) modem, a telephone modem, ethernet card, or a wireless modem for communications with other equipment, or any other suitable communications circuitry. Such communications may involve the Internet or any other suitable communications networks or paths. In addition, communications circuitry may include circuitry that enables peer-to-peer communication of primary equipment devices, or communication of primary equipment devices in locations remote from each other (described in more detail below).

Memory may be an electronic storage device provided as the storage 308 that is part of the control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum-storage devices, gaming consoles, gaming media, or any other suitable fixed or removable storage devices, and/or any combination of the same. The storage 308 may be used to store user and helper preferences, privacy and sharing preferences, knowledge trees, identifiers for interested products and services, machine learning data, consumption histories, and NLP, ML, AI algorithms and all the functionalities and processes discussed herein. Cloud-based storage, described in relation to FIG. 3, may be used to supplement the storage 308 or instead of the storage 308.

The control circuitry 304 may include audio generating circuitry and tuning circuitry, such as one or more analog tuners, audio generation circuitry, filters or any other suitable tuning or audio circuits or combinations of such circuits. The control circuitry 304 may also include scaler circuitry for upconverting and down converting content into the preferred output format of the primary equipment device 300. The control circuitry 304 may also include digital-to-analog converter circuitry and analog-to-digital converter circuitry for converting between digital and analog signals. The tuning and encoding circuitry may be used by the primary equipment device 300 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 308 is provided as a separate device from the primary equipment device 300, the tuning and encoding circuitry (including multiple tuners) may be associated with the storage 308.

The user may utter instructions to the control circuitry 304, which are received by the microphone 316. The microphone 316 may be any microphone (or microphones) capable of detecting human speech. The microphone 316 is connected to the processing circuitry 306 to transmit detected voice commands and other speech thereto for processing. In some embodiments, voice assistants (e.g., Siri, Alexa, Google Home and similar such voice assistants) receive and process the voice commands and other speech.

The primary equipment device 300 may include an interface 310. The interface 310 may be any suitable user interface, such as a remote control, mouse, trackball, keypad, keyboard, touch screen, touchpad, stylus input, joystick, or other user input interfaces. A display 312 may be provided as a stand-alone device or integrated with other elements of the primary equipment device 300. For example, the display 312 may be a touchscreen or touch-sensitive display. In such circumstances, the interface 310 may be integrated with or combined with the microphone 316. When the interface 310 is configured with a screen, such a screen may be one or more monitors, a television, a liquid crystal display (LCD) for a mobile device, active-matrix display, cathode-ray tube display, light-emitting diode display, organic light-emitting diode display, quantum-dot display, or any other suitable equipment for displaying visual images. In some embodiments, the interface 310 may be HDTV-capable. In some embodiments, the display 312 may be a 3D display. The speaker (or speakers) 314 may be provided as integrated with other elements of primary equipment device 300 or may be a stand-alone unit. In some embodiments, the display 312 may be outputted through speaker 314.

The equipment device 300 of FIG. 3 can be implemented in system 200 of FIG. 2 as primary equipment device 202, but any other type of user equipment suitable for allowing communications between two separate user devices for performing the functions elated to implementing machine learning (ML) and artificial intelligence (AI) algorithms, and all the functionalities discussed associated with the figures mentioned in this application The primary equipment device 300 of any other type of suitable user equipment suitable may also be used to implement ML and AI algorithms, and related functions and processes as described herein. For example, primary equipment devices such as television equipment, computer equipment, wireless user communication devices, or similar such devices may be used. Primary equipment devices may be part of a network of devices. Various network configurations of devices may be implemented and are discussed in more detail below.

Figure 4:
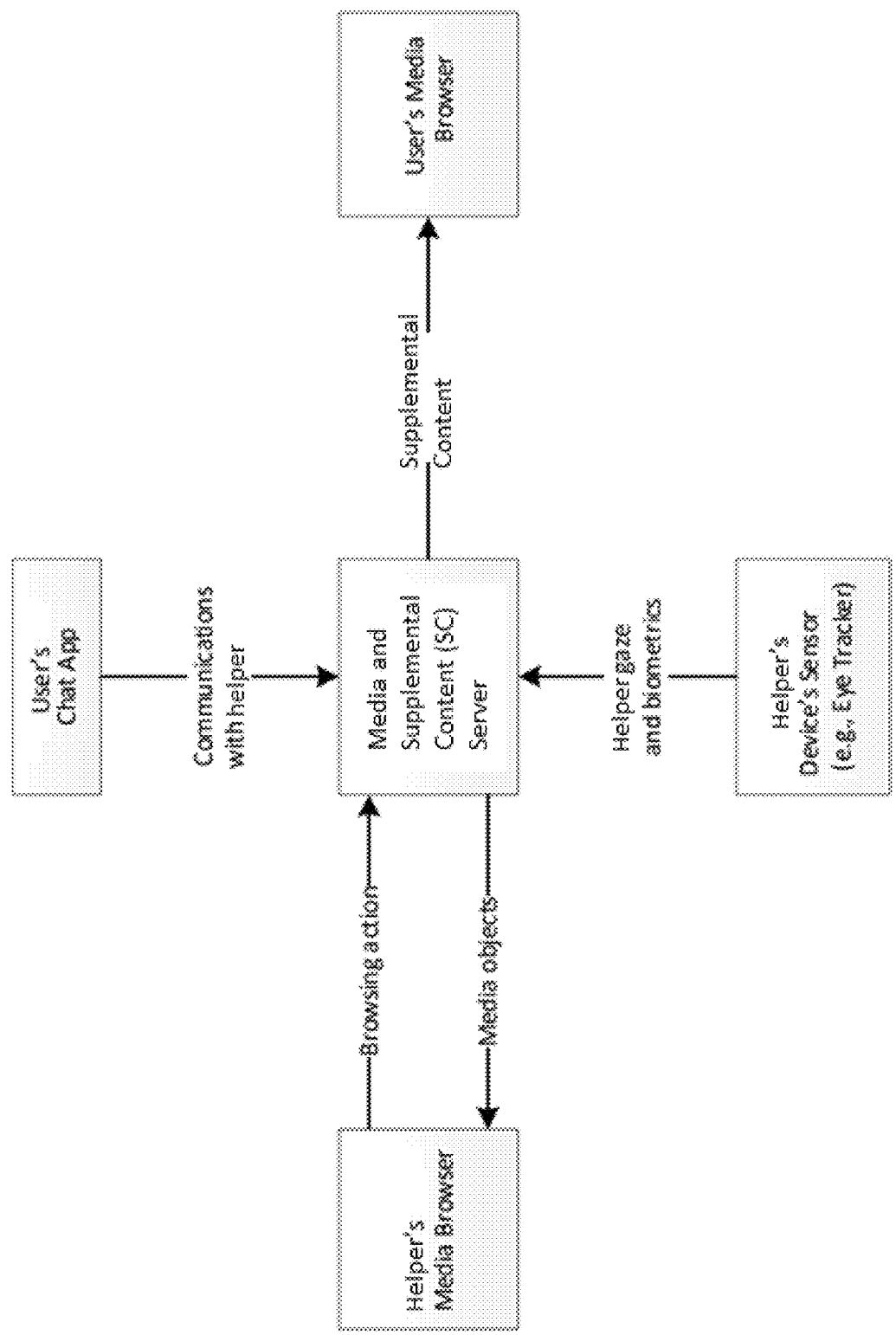
FIG. 4 is a block diagram of an example system with a media and supplemental content server, in accordance with some embodiments of the disclosure.

FIG. 4 is a block diagram of an example system with a media and supplemental content server, in accordance with some embodiments of the disclosure. In one embodiment, a media and supplemental content server receive (or intercept) communications between a user and a helper. The media and supplemental content server determines products or product types related to communications from the user to the helper. Availability of the products and interests of the user in the products are also determined.

After the communication between the user and helper, a determination is made whether to track the helper. If a determination is made to track the helper, the helper's browsing actions to access content are tracked. These actions include browsing the internet, clicking at some links already in possession of the helper, consuming a media asset on a media device, using a virtual reality headset to view live and virtual objects, consuming data on a social media site, texting, or talking on the phone).

The media and supplemental content server determines what objects, i.e., products and services, are of interest to the helper. Interest may be gauged based on the helper's gaze, heartbeat, motion, statements made, or other means as discussed in FIG. 8.

The media and supplemental content server filters those products and services (media objects) to select those that are related to the products and product types related to the user's communications with the helper. The media and supplemental content server also filters products based on any preference stored by the user in their profile.

The media and supplemental content server determines relevant supplemental content for the user based on the filtered products and services and sends that supplemental content to the user's device, e.g., media browser, mobile phone, laptop, etc. The media and supplemental content server may also store the products in a user's wishlist for later purchase. The media and supplemental content server is used to perform the processes described in FIGS. 1 and 6.

Figure 5:
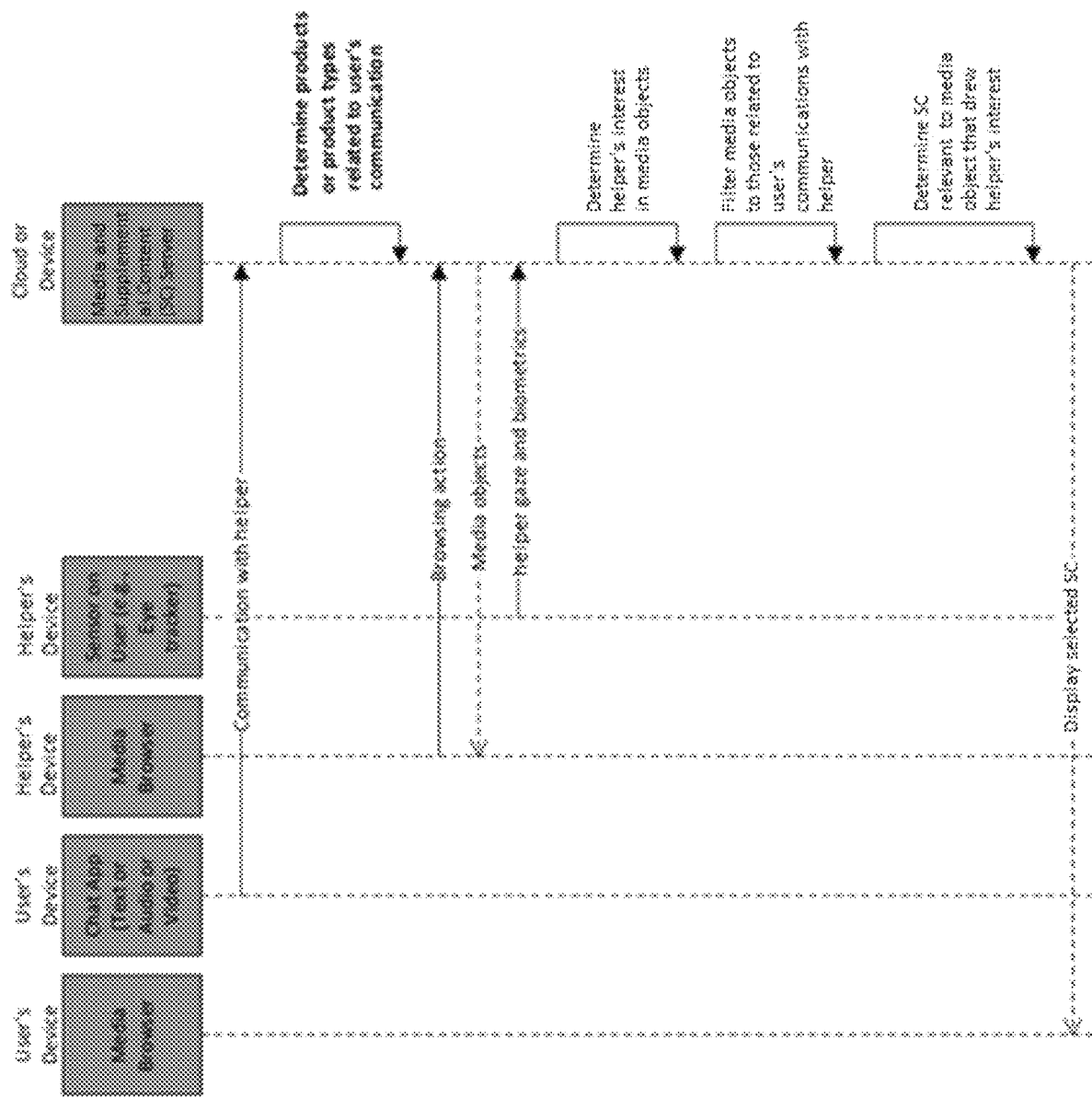
FIG. 5 is a block diagram of communications between a user, helper, and system for implementing the processes described herein, in accordance with some embodiments of the disclosure.

FIG. 5 is a block diagram of communications between a user, helper, and system for implementing the processes described herein, in accordance with some embodiments of the disclosure. In one embodiment, the communication between a user and a helper involves the user using their chat application, such as on their mobile phone, to communicate with the media and supplemental content server. The media and supplemental content server receives the communication from the user's chat application and in response determines products or product types related to the user's communication. The helper, who is being tracked by the system, performs browsing action using their media browser. The data related to the browsing action is provided to the media and supplemental content server. For example, this data can be the helper's interest in a particular product or service displayed on an Internet page. The media and supplemental content server receives data relating to the browsing action from the helper's device (the media browser) and in response provides media objects (products and services) to the helper's device. Cameras, which are used to track the helper's gaze, are used to determine the helper's interest in the media objects. The media and supplemental content server determines the helper's interest in media objects, filters media objects based on the communications between the user and helper and any preferences set by the user and determines supplemental content that is relevant for the user, which is based on the helper's interest. The media and supplemental content server transmits the supplemental content to the user's device, which may be a media browser, to display the supplemental content.

Figure 6:
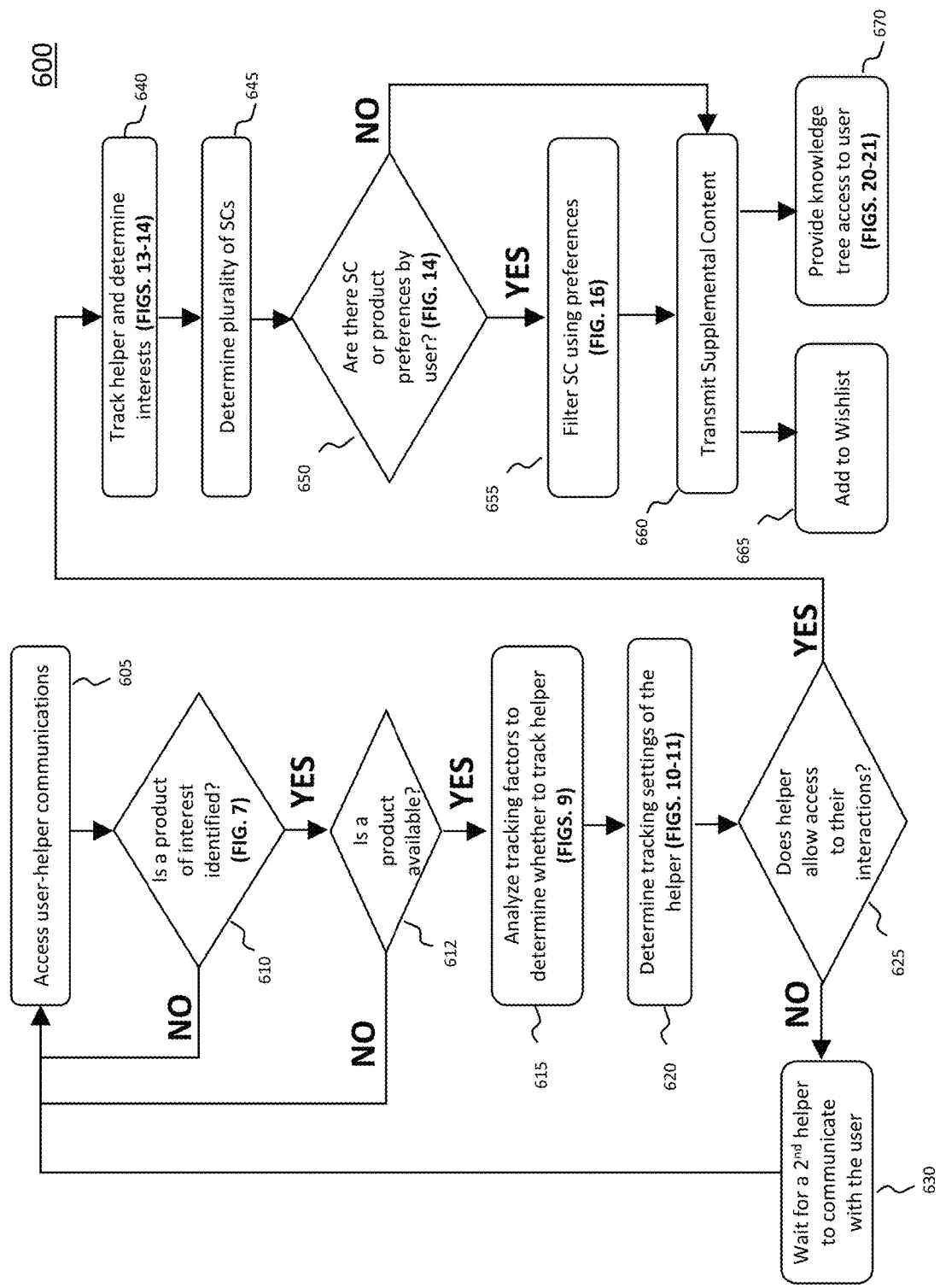
FIG. 6 is a flowchart of a process for determining supplemental content for display on a user device based on a user-helper communication and a helper's interactions that follows the user-helper communication, in accordance with some embodiments of the disclosure.

FIG. 6 is a flowchart of a process 600 for determining supplemental content to display on a user device based on a user-helper communication and the helper's interactions that follow the user-helper communication, in accordance with some embodiments of the disclosure.

At block 605, a user and a helper engage in a conversation. The conversation may be live, real-time, and in person in which the user and the helper are engaged in a discussion as displayed in block 1 of FIG. 1. When the conversation is in person, the user and the helper's electronic devices, such as their mobile phone, tablet, smart watch, or laptop, that are on hand or within a vicinity may listen in on the conversation through a microphone associated with the device. The conversation or snippets of the conversation may be sent to a server, such as a media or an supplemental content server. The processing of the conversation, causing the snippets to be sent to the server, and the steps discussed in FIG. 6 may be performed by control circuitry, such as the control circuitry 220 and/or 228 described in the description of FIG. 2.

The conversation may also occur on other platforms, such via a text or a phone call. Likewise, the user and the helper's electronic devices that were used for making the phone call may listen in on the conversation through a microphone associated with the device. The conversation or snippets of the conversation may be sent to a server.

The conversation may also occur on an email or other platform where messages can be exchanged, such as Slack™. When the conversation is on such message exchange platform, the messages that relate to products or services that may be of interest to the user, including the context around such messages, may be pulled out and sent to a server.

Other platforms such as video conferencing or a social media platform may also be used for user-helper communications. The user's and the helper's electronic devices may obtain data from such conversations, such as audio, video, and or textual data, and provide the data to a server, such as a media or an supplemental content server.

The conversation may be between two individuals, or the conversation may be between an individual and a smart device, such as a digital assistant. For example, a conversation may be between the user and a listening IoT device, such as Alexa®, owned by Amazon®, or Siri®, owned by Apple®. In this example, a user may utter a request to the digital assistant, and a voice command/input to an Alexa device may be considered part of the conversation. Likewise, a response (to the voice input) from the Alexa device may also be considered as part of the conversation. A voice input from a user (e.g., such as by the user in block 1 of FIG. 1) that says, "Hey Siri, what is the price of Nike® Runstar shoes," or "What type of insoles should I put in my shoes while running so that I don't feel pain." A response by the digital assistant providing data or links to places where the products are sold or links to what types of insoles might help ease the pain may be extracted and sent to the server.

At block 610, a determination is made whether the product or service mentioned during the conversation between the user and helper, or the user and the digital assistant, includes a product or service that is of interest to the user. The product or service mentioned during the conversation does not have to be specific to a product or service brand name. The mention may be more generalized, such as just a genre may be mentioned. For example, conversations that include a generalized mention of tea, basketball, shoes, or electric cars without referring to any specific brand name may be analyzed to determine if a product relating to such mentions would be of interest to the user.

Determining user interest in a user-helper communication, such as based on a user or helper mention of a word, phrase, or name with which a product or service may be associated, distinguishes casual mentions that may not be of interest to the user from mentions in which the user may likely be interested in a product or service that they likely may purchase. In one embodiment, as described below in FIG. 7, the system automatically determines user interest without any user intervention, by analyzing the conversation. In another embodiment, the user or helper may be prompted during the conversation on their device whether they are interested in hearing about products that the system has flagged based on the conversation and the system may provide a list for the user to approve.

At block 610, if a determination is made that the user-helper communication includes a word, phrase, or name that may be associated with a product or service that is of interest to the user, then the process 600 moves to block 612. If a determination is made that the user-helper communication does not include a product or service that is of interest to the user, then the process moves back to block 605, where the system continues to listen in (or obtain data) from the user-helper communication until a product or service that is of interest to the user is identified. In some embodiments, the system may listen in for a predetermined period of time and then automatically stop listening if no product or service that is of interest to the user is identified.

At block 612, the system may determine whether the product or service of interest identified at block 610 is a product or service that is available in the marketplace. In one embodiment, the system may search the Internet to determine if the product or service identified is an actual product that is being sold by a vendor. The system may also use other methods to determine if the mention relates to an actual product or service. For example, in one embodiment, the system may maintain a list of product names and descriptions based on some catalog or history of prior ads received from advertisement brokers. Alternatively, the system may maintain a list of product names and descriptions for which ads are to be transmitted to the user. In yet another embodiment, the system may maintain a list of all the ads that are under contract for delivery to users. For example, the system may have ads for (1) tea from Lipton® and Harney & Sons®, (2) Bailey's Irish Cream®, (3) BMW®, (4) Mercedes-Benz®, and so on.

The steps described in blocks 610 and 612 may be interchangeable. That is, a determination may be first made by the control circuitry 220 and/or 228 whether a product mention is available on the market, as described in block 612, prior to determining if that product is of interest to the user. Regardless of the order, the steps described in blocks 610 and 612 ensure that whatever word, phrase, or name that may be associated with a product or service is something that is actually sold in the marketplace and is of interest to the user. As such, if a determination is made that a product identified is not available in the marketplace, then the process moves from block 612 back to block 605, where the system continues to monitor the user-helper communication until a product of interest that is also available in the marketplace is identified.

Ensuring that the product is available and of interest allows the system to prevent utilizing system resources in performing further processing, such as tracking of a helper, when the product is not of interest or not available in the marketplace. For example, the user-helper may mention a name of a product that is no longer made and as such is not being sold by any vendor. One of the objectives of the present system is to utilize a helper's knowledge in identifying a product currently sold such that the information can be intelligently used in honing down a customized supplemental content that can be transmitted to the user to increase the likelihood of their buying that product. Thus, the product not being available in the marketplace defeats that objective, and in such a case, no further processing is performed.

At block 615, once relevant products or services have been identified, i.e., products or services that are a) deemed of interest to the user based on analysis of the conversation between the user and the helper and b) available in the marketplace, then the system determines whether to track future interactions of the helper. In one embodiment, the system automatically tracks a helper once relevant products and their availability have been identified through the conversation between helper and user. In another embodiment, the system analyzes a plurality of factors related to the helper to determine whether to track the helper's future interactions. The analysis is performed to determine if the helper would in fact actually be helpful in suggesting products or services based on their implicit world knowledge of the products or services discussed during the conversation that were deemed relevant at blocks 610 and 612. Tapping into the helper's implicit knowledge as well as perhaps their understanding of the user's needs, based on their relationship with the user, provides the system with a new source of knowledge about the user. This new source is absent from approaches that simply use behavior and crawl for words to determine and suggest products for purchase. By mining the helper's knowledge, with no explicit action by any user, the system is able to improve the user experience with supplemental content. It is also able to help the user experience with many other benefits, including, increasing ad revenue while avoiding any disruption of the user experience of the users concerned, and providing relevant and targeted ads to the user that may come from a source (such as the helper) that knows the user and their likes and dislikes.

Some of the factors analyzed in determining whether to track the helper include a) the helper's consumption history, b) the helper's skills, c) the helper-user relationship, d) the helper's ownership of products or services related to the products or services identified as relevant in blocks 610 and 612, e) the helper's expertise, and/or f) the helper's job or educational background. The helper's actions when using a virtual, augmented, or mixed reality device and expressing their emotions for objects seen through the virtual reality device may also be a factor that is considered by the system.

In another embodiment, the helper's actions while consuming a media asset, such as the helper's gaze, heartbeat, or facial expressions may also be used. For example, in a scenario where a helper consuming a media asset after their conversation with the user, as described at block 605, comes across a product or service displayed in the media asset, then a camera of the media device used for consuming the media asset may be used to determine the helper's gaze. Monitoring the gaze may allow the system to determine the helper's interest level in a product or service displayed. It is well known that the human eye does not fixate steadily at any scene but instead moves continually. However, the eye can appear to fixate on certain parts of the scene that are of interest. As such, the helper's interest may be determined based on which media objects or products and services within the media asset the helper's gaze fixates. Additional factors for determining the helper's interest are described below in relation to FIGS. 8-9.

Figure 10:
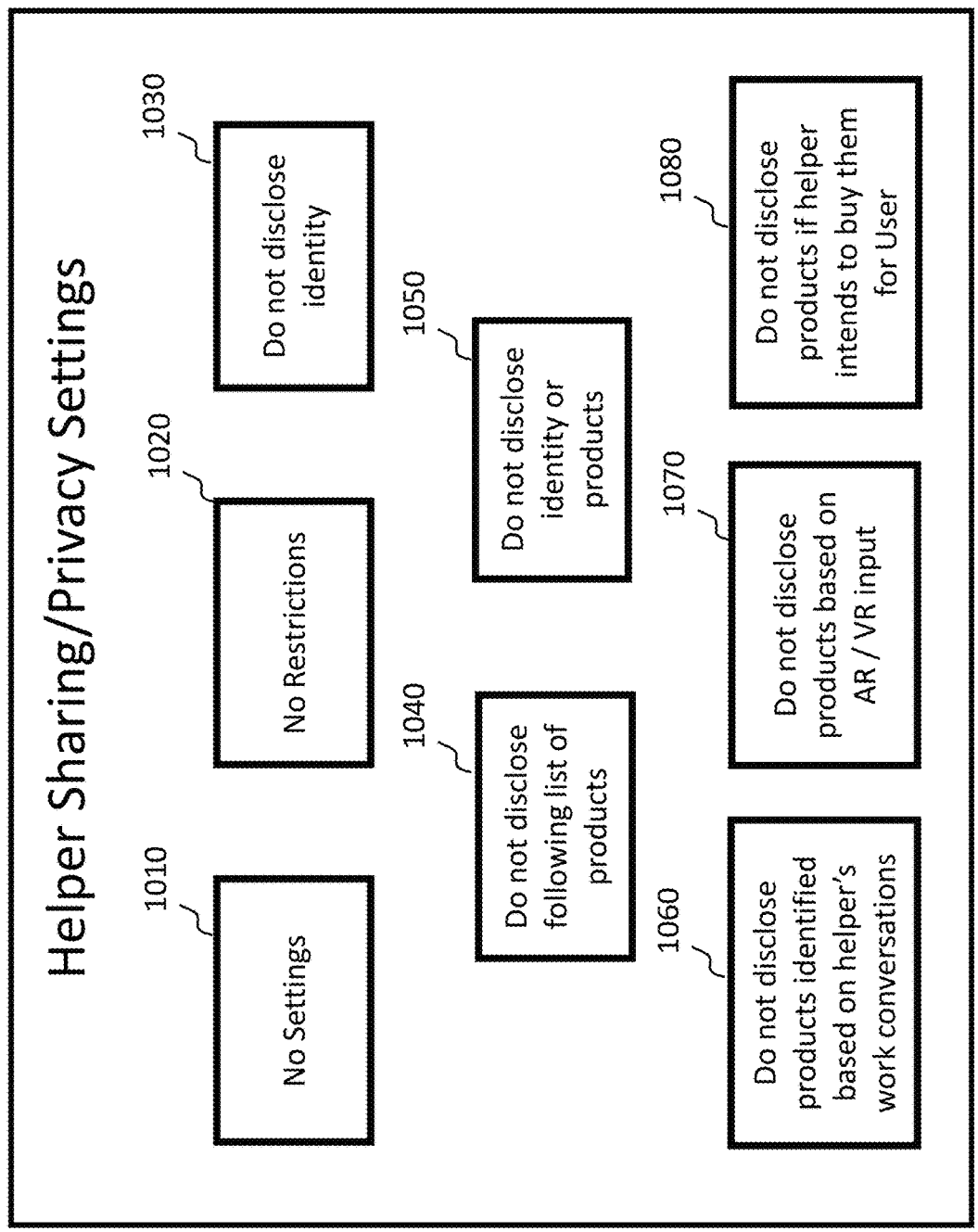
FIG. 10 is an example of categories of sharing and privacy settings of a helper that are used in tracking the helper, in accordance with some embodiments of the disclosure.

At block 625, the system may check the helper's profile or settings to determine if the helper has any restrictions or limitations on sharing their interactions that occur subsequent to the conversation with the user or any restrictions on sharing their identity. In some embodiments, the helper may have set preferences in their profile that relate to allowing or restricting the sharing of their interactions. As depicted in FIG. 10, these preferences may include, no restrictions, share data but not identity, do not share data, share limited data, share interactions until a specific date or a particular event, or some other privacy or sharing settings. Additional details are provided below in the description of FIG. 10.

In another embodiment, the helper may not have set their preferences in terms of sharing or privacy. In such circumstances, a machine learning engine may execute a machine learning algorithm to analyze the helper's prior conversations or consumption history to determine if the helper has either restricted, made any comments, or perform any actions that may indicate the helper's sharing and privacy preferences. If such prior data is found, the machine learning algorithm may identify such data so that it can be complied with prior to tracking the helper. In yet another embodiment, the system may display a prompt or some other type of message to the helper asking the helper's permission to disclose their identity or access their future interactions.

In yet another embodiment, the topic of discussion between the user and the helper may be a sensitive or confidential topic. In such a scenario, when no sharing or privacy preferences have been set by the helper, the system may automatically flag the topic as a sensitive topic and alert the helper in order to get their approval on allowing tracking their future interactions that relate to the sensitive or confidential topic. Additional details of sensitive, confidential, seasonal, or time-based type of topics and their handling are described below in the discussion of FIGS. 11a-11C and FIG. 12.

In one embodiment, at block 625, if the helper preferences do not allow access to their future interactions, then the process 600 may move from block 625 to block 630 and then to block 605. Since the helper does not allow access to their interactions, the system would continue to look for communications between the user and a second helper (or a third and fourth helper) and process blocks 605-620 until the system determines that another helper does not have a pre-set setting in their profile or stored at another place that prevents monitoring and tracking of their future interactions.

At block 640, the system may track interactions of the helper. These may include the helper's interactions relating to web browsing, social media, media asset consumption, virtual, augmented, or mixed reality device usage, texting, audio inputs through a variety of means including and audio input into a mobile phone while talking in real time to a live person, digital assistant use, and any other inputs through which voice, video, or data can be obtained. Additional details of types of future interactions tracked and platforms used are described below in the discussion of FIG. 13. The system may also determine the amount of time to track the helper and their future interactions. Additional details about the amount of time a helper is tracked are described below in the discussion of FIG. 13.

At block 645, the system obtains data from all helper interactions that a) occur subsequent to the conversation with the user and b) are related to the products identified in blocks 610 and 612, i.e., products or services of interest to the user that are available in the marketplace. Based on the data, the system may identify one or more specific products that are available for sale in a physical or an online store or through a service. The system may provide data relating to the identified one or more specific products to supplemental content server for further processing. In one embodiment, the system may include its own advertising server, and in another, the advertising server may be communicatively connected to the system, such as through the Internet.

In one embodiment, the supplemental content server may access one or more pieces of supplemental content related to the identified one or more specific products that were identified based on the helper's interactions. For example, if the helper's interactions relate to a model or version of the Nike Runstar shoes, and the system determines that the helper has shown interest in the product, then the system may access supplemental content from one or more stores or online platforms that sell that specific model or version of the Nike Runstar shoes. For example, as depicted in block 6 of FIG. 1, the system identified three platforms where the Nike Runstar shoes are sold. The system may then determine if supplemental content is available for the Nike Runstar shoes from the identified platforms. If supplemental content do not exist or are not available for any reason, then the system may select product offered by those vendors that have supplemental content available for their products. In another embodiment, the system may request supplemental content to be generated.

At block 650, the system may determine if the user has set any preferences for receiving ads or purchasing of a product or service. In one embodiment, the user may have set preferences in their profile on what type of ads are preferred and what type of ads are not preferred. For example, the user may have set preferences that they prefer ads relating to only those products that are under a budget, from a store that is closer to their house, that have high reviews, etc. Additional discussion of the preferences for receiving ads and types of products desired is provided below in discussion of FIG. 15.

In another embodiment, the user may not have set their preferences for types of ads preferred or not of interest. In such circumstances, a machine learning engine may execute a machine learning algorithm to analyze the user's prior purchase history or prior interactions. If such prior data is found, the machine learning algorithm may identify such data so that it could be used in determining whether the user would likely prefer or not prefer a given piece of supplemental content.

Figure 14:
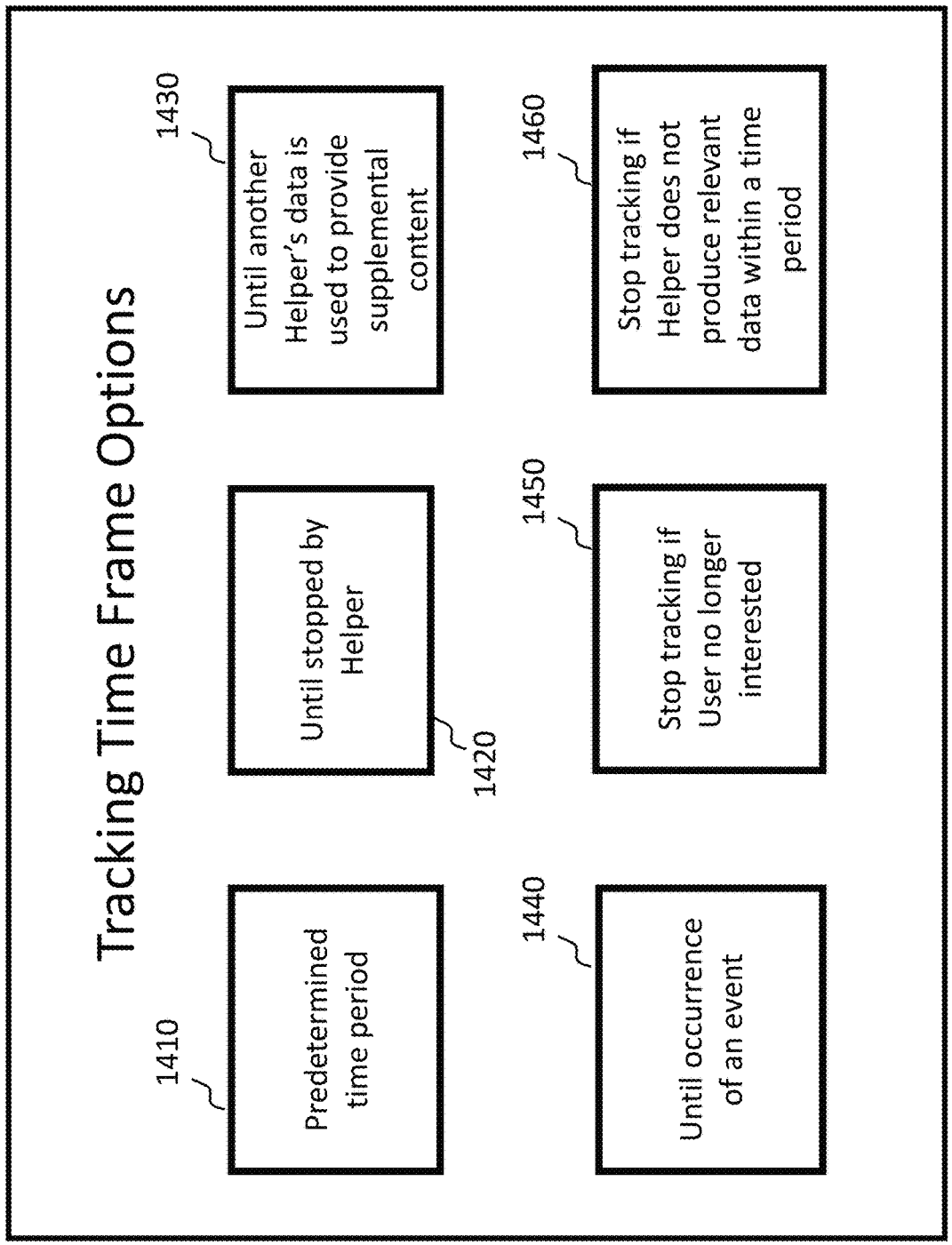
FIG. 14 is a block diagram of time frames to track a helper, in accordance with some embodiments of the disclosure.
Figure 15:
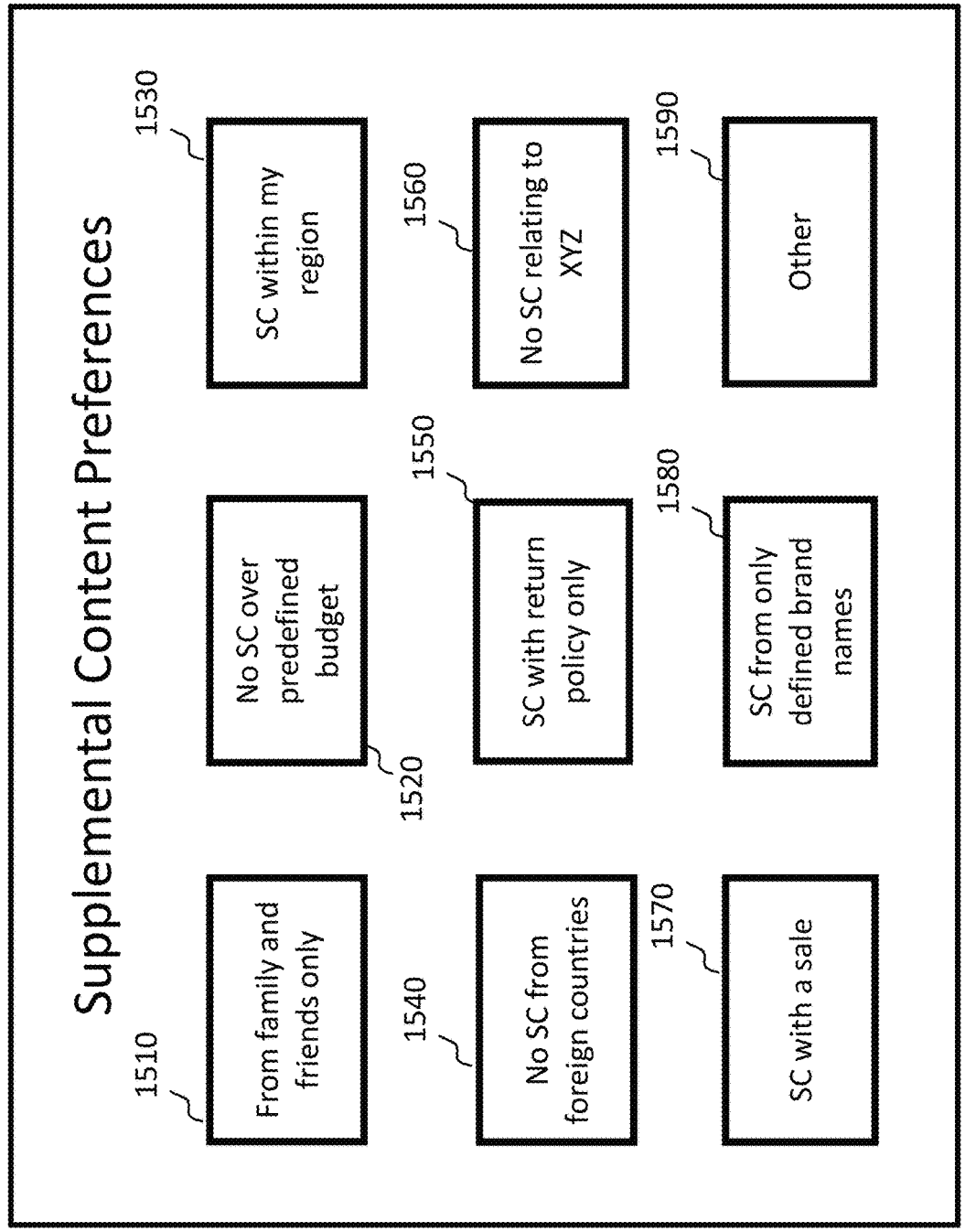
FIG. 15 is a block diagram of examples of user preferences for supplemental content, in accordance with some embodiments of the disclosure.

At block 655, the system may filter the supplemental content listed in block 650 based on the user settings provided in FIG. 14 and/or FIG. 15 and transmit the ads to the user at block 660.

In some embodiments, at blocks 665 and 670, the control circuitry 220 and/or 228 may add the ads and the related products to the user's wishlist. The system may also provide a knowledge tree of the details behind the suggestion of each ad, such as which helper recommended the product and what future interaction of the helper was used in determining that the product associated with the supplemental content would be of interest to the user. Additional details of the knowledge trees are provided in the discussion of FIGS. 20 and 21.

Additionally, some examples of the process 600 are provided below in the discussion of FIGS. 18 and 19 including certain special situations such as in FIGS. 11a-11c.

Figure 7:
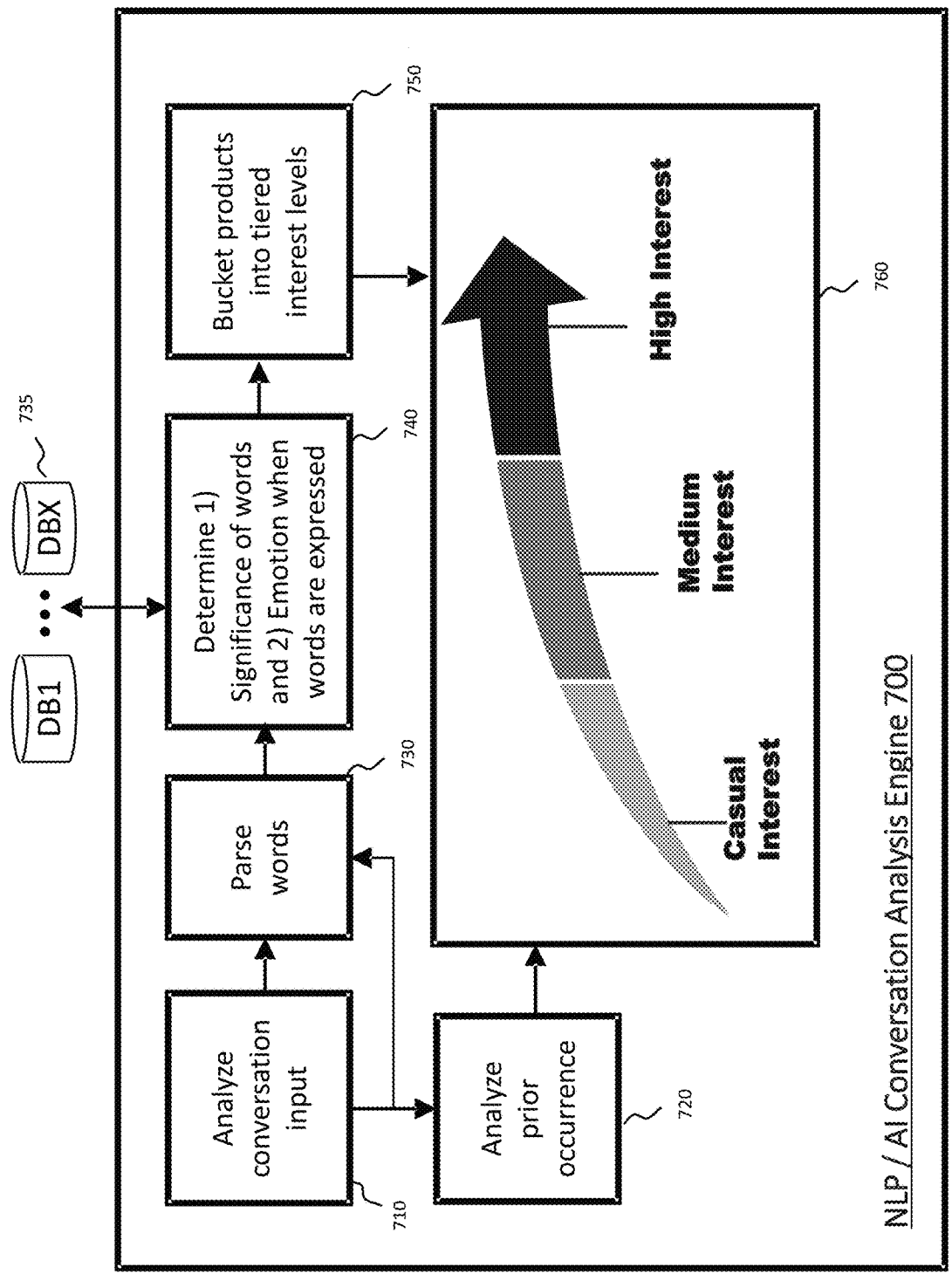
FIG. 7 is a block diagram of determining a user's interest in a service or product, in accordance with some embodiments of the disclosure.

FIG. 7 is a block diagram of determining a user's interest in a service or product, in accordance with some embodiments of the disclosure. In one embodiment, at block 710, the system analyzes a conversation between the user and the helper. The system receives the conversation input and parses the words or phrases of the conversation at block 730. The system then determines the significance of the words, phrases or names used and the emotion involved with expressing such words at block 740. In one embodiment, the system may connect with a plurality of databases 735 to determine the significance of the words and phrases obtain from the conversation. For example, expressing your liking for a product may be done at least in the following three ways: "It's OK," "It looks good," or "It's amazing." Each of the phrases has a different level of excitement associated with it, and the system may analyze such phrases and determine the different levels of excitement associated with them. Once the words and phrases have been analyzed based on their significance and emotion in the context of the conversation between the user and helper, they may then be bucketed into different interest tier levels at block 750. One example of such interest tier levels is shown in block 760. They include casual interest, medium interest, and high level of interest in the product discussed in the conversation.

In another embodiment, the system may analyze prior discussions of the user with other individuals and helpers to determine if that user is interested in a particular product. For example, if the user has discussed a particular product in the current conversation, but it is not easy to determine their current interest level, then the system may look at prior conversations to determine if the user is in fact interested and, if so, to what level for that specific product. In one embodiment, the system may invoke a machine learning engine to execute a machine learning algorithm and analyze the user's prior history. Once a determination is made of the user's level of interest from prior conversations, by the control circuitry 220 and/or 228 of the system in FIG. 1 may then bucket the current product discussed with the helper into one of the three tiers of interest as depicted in block 760. Although only three tiers of interest levels have been depicted, a variety of interest levels, such as ranging from a scale of 1 to 10 and other scales, may also be used.

Figure 8:
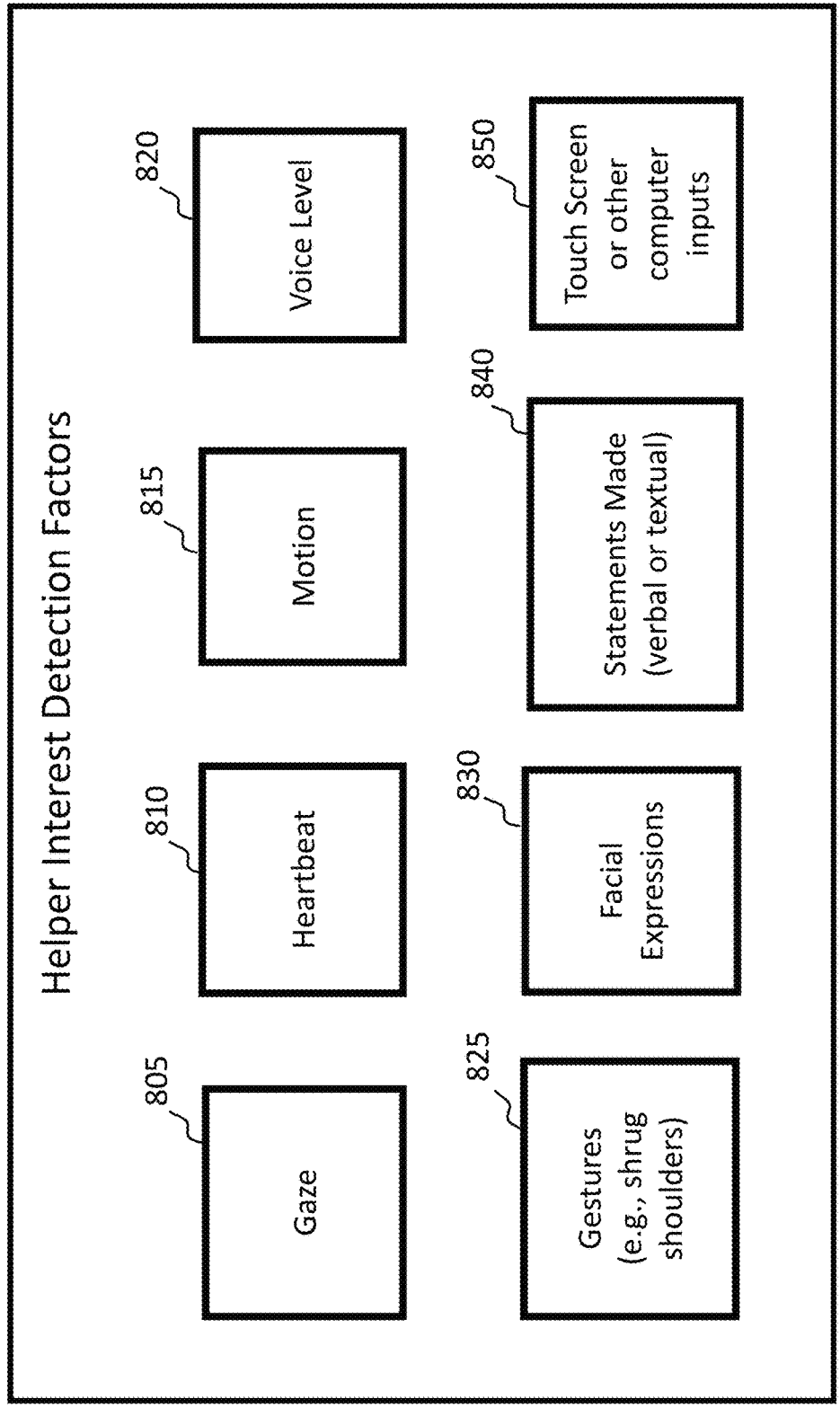
FIG. 8 is a block diagram of helper interest-detection factors, in accordance with some embodiments of the disclosure.

FIG. 8 is a block diagram of determining a helper's interest in a service or product, in accordance with some embodiments of the disclosure. As mentioned earlier, after the conversation between the user and helper, if products or services, or words, phrases, or names that can be associated with products and services, are mentioned, then the system tracks the helper's future interactions to determine whether the helper's insights can be leveraged to suggest products for the user. Leveraging the helper's knowledge of the user's needs and interests, based on words, phrases, name and context obtained and analyzed from their recent conversation, allows the system to push supplemental content related to products that are potentially valuable to the user. One of the many benefits of this approach includes better matching ads based not only on the user's expressed needs but also taking advantage of the implicit world knowledge possessed by the helper with whom the user communicated. It also allows the system to expand the diversity of the ads delivered to the user in a way that brings forth the knowledge of helping users who might themselves be or not be in the market for similar products that are of interest to the user.

Leveraging the helper's knowledge, background, and interest includes analyzing the helper's interactions that occurred after their conversation with the user. Such analyses, in one embodiment, are based on at least the following factors, either separately or in combination: gaze, heartbeat, motion, voice levels, gestures, facial expressions, statements made, and other inputs such as through a mouse or touchscreen.

Figure 13:
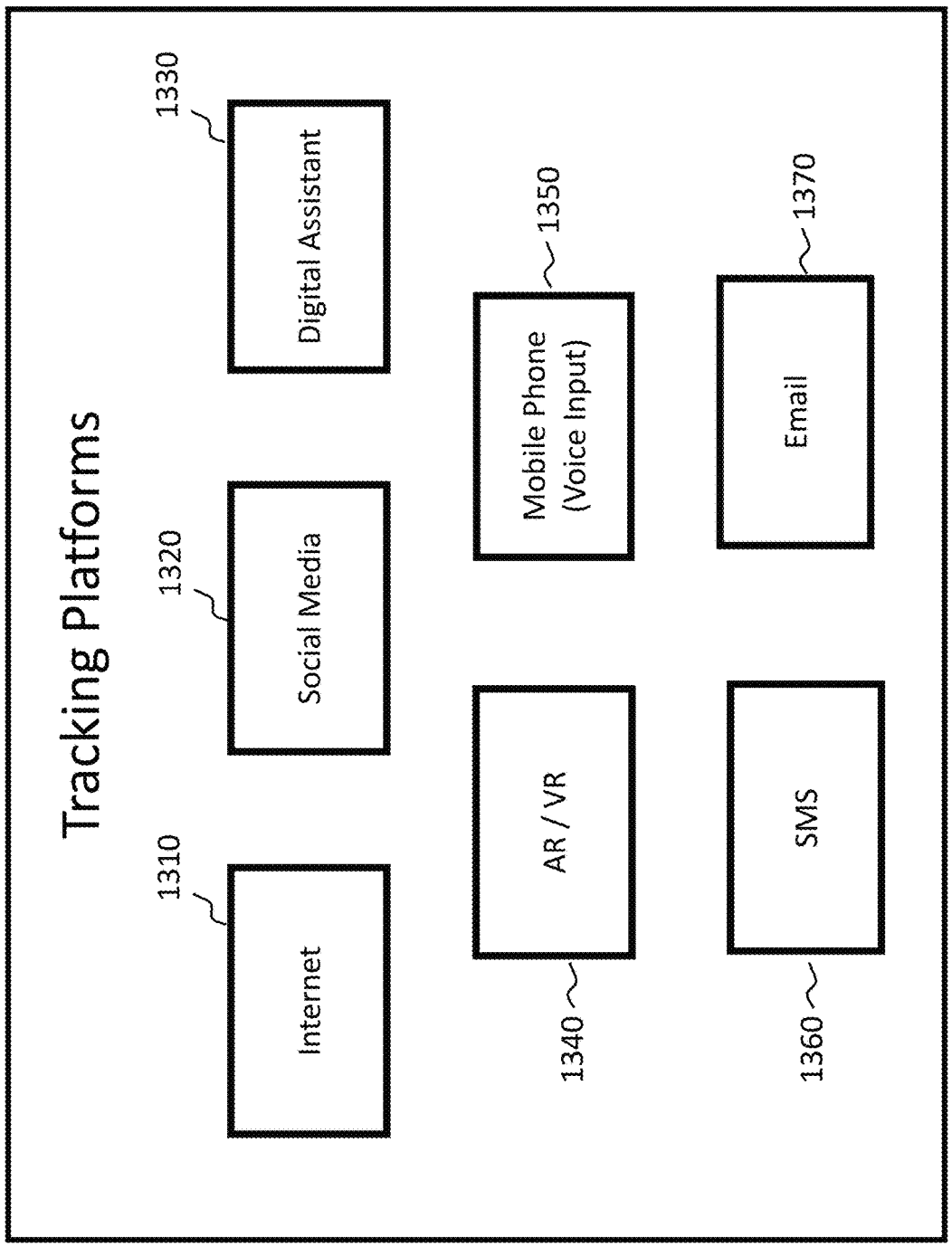
FIG. 13 is a block diagram of various tracking platforms and associated inputs, in accordance with some embodiments of the disclosure.

In one embodiment, as depicted in block 805, the system, such as through control circuitries 220 or 228 may monitor the helper's gaze during the consumption by the helper on any of the platforms mentioned in FIG. 13. For example, while consuming a media asset, social media content, AR/VR content, email content, or content on their mobile device.

In one embodiment, the helper's gaze may be monitored using an inward facing camera of the electronic device if they are consuming the content on their mobile phone. The helper's gaze may also be monitored using a camera of a media device, such as a smart television, if the helper is consuming a media asset on a television. In yet another embodiment, the helper's gaze may be monitored using an inward facing camera of a virtual, mixed, or augmented reality device if the helper is consuming the content on their AR/VR type device.

For example, if the helper is looking at an object in the media asset displayed on the television, they system may associate such gaze with an interest in the object displayed. Since the conversation in FIG. 1 at block 1 related to running shoes and insoles, if the object on the media device was a product by some company that sells running shoes or insoles and the helper's gaze seems to be fixated on the position of the media asset, the control circuitry 220 and/or 228 of the system in FIG. 1 may associate that product with a product of interest for the helper. Subsequently, as described in process 600, the system may execute steps of blocks 645-660 to provide supplemental content for that product on which the helper's gaze was fixated to the user.

In adding to the gaze being fixated, the system may also monitor for repeated gaze to determine interest in the object displayed. To determine such engagement, an inward-facing camera or a media device camera may be accessed by the system to determine the gaze of the helper and an eye-tracking mechanism may be deployed to track the eyeball movement to determine if the helper is engaged with any one or more of the objects displayed.

In another embodiment, as depicted in block 810, the system may monitor the helper's heart rate to determine if the helper is interested in a product or service they have consumed. To determine interest based on heart rate, the system may determine the helper's heartbeats. For example, the helper may be wearing a smart watch that can monitor the helper's heart rate or carrying a mobile device that can measure the helper's heart rate. The system may access such devices and monitor the helper's heart rate before and after the helper's engagement with the product or service that is related to the conversation between the user and helper. The system may monitor the delta between the heart rate before, during, and after the engagement with each product or service, and if the heart rate has changed and exceeds a threshold delta, then the control circuitry 220 and/or 228 of the system in FIG. 1 may determine that the helper is interested in the displayed product or service. For example, if the helper sees a cool shoe design on any of the platforms of FIG. 13 and their heartrate goes up with excitement as they recently had this discussion with the user, then the system associates such rise in heartrate for the shoe with an interest and system may execute steps of blocks 645-660 to provide supplemental content for cool shoe design to the user.

In another embodiment, as depicted in block 815, the system may monitor the helper's motion to determine if the helper is interested in a product or service that is related to the product or service discussed with the user and that the helper may have consumed through any of the platforms described in FIG. 13. In this embodiment, a gyroscope, motion sensor, or accelerometer associated with electronic device user by the helper to consume the content is accessed. The system may access such gyroscope, motion sensor, or accelerometer to determine the helper's body movements before, during, and after engagement with the content. Such body movement may be analyzed by the system, such as by using an AI algorithm, to determine if the movements can be associated with helper interest in the product or service consumed. For example, the helper viewing a shoe product may react with excitement and gesture as such, with their body thereby being in motion, and such motion may be associated with the helper's interest in the shoe that is displayed.

In another embodiment, as depicted in block 820, the system may monitor the helper's voice levels to determine if the helper is interested in product or service that is related to the product or service discussed with the user and that the helper is consuming through any of the platforms described in FIG. 13. In this embodiment, the system may access a microphone of the electronic device user by the helper to consume the content. The system may keep a record of the helper's voice level during the display of the content. If the system notices that the voice level has peaked at a certain stage, then the system may associate the rise in voice level with the helper's excitement for the product, such as the shoe, displayed, viewed or consumed in some other manner, such as through line in person interaction with someone, or text, email or social media.

In another embodiment, as depicted in block 825, the system may monitor the helper's gestures to determine if the helper is interested in a particular product or service. In this embodiment, the system may access cameras either on the helper's electronic device or other cameras, such as smart home cameras, that are directed towards the helper, and then determine the helper's gestures while the helper is consuming the content. If the system views any gestures made by the helper as being associated with excitement, such as raising hands in excitement, clapping etc., then the system may use such input as interest in the product or service.

Likewise, as depicted in block 830, the system may also access cameras either on the electronic device user by the helper to consume the content is accessed, such as the inward-facing camera of a mobile phone, or other cameras, such as smart home cameras, that are directed towards the helper, and analyze the facial expressions of the helper to determine if the helper is interested in product or service. For example, a facial expression such as a smile or eyes widened in excitement can be associated with helper interest.

In another embodiment, as depicted in block 840, the system may monitor the helper's statements, whether verbal or textual, to determine if the helper is interested in a product or service that is related to the product or service discussed with the user and that the helper may have consumed through any of the platforms described in FIG. 13. In this embodiment, the control circuitry 228 of the system in FIG. 1 may access the helper's mobile phone, other wearable devices that have a microphone to monitor the helper's voice input, or digital assistant tools such as Alexa™ or Siri™. The system, through the control circuitry, may continuously or periodically monitor the voice input through the microphone during the display of the content to determine if the helper makes any statement that can be associated with excitement. The control circuitry 228 may use a natural language processing (NLP) algorithm and an artificial intelligence (AI) to analyze the statements made such that it can determine whether such statements may be associated with helper interest in a particular product or service. The system may also monitor textual statements by the helper such as an SMS or an MMS sent or received by the helper using their mobile device or comments made by the helper in a post on a social media platform while the helper is consuming the content, such as seeing a new shoe that may be good for running etc. The system may associate the timing of such text or post with whatever product or service is being displayed at the time as the helper being interested in such product or service. In addition to the above, any interactions expressed in the metaverse can also be associated with helper interest in a product or service. Likewise, any interactions such as in block 850 where a helper performs a touch screen operation or hovers over an object with their computer mouse or performs and other computer operation selecting the object can also be associated with helper interest in a product or service. Although references were made to system performing the function in blocks 805-850, it may the control circuitry associated with the system that is utilized by the system to perform the recited function, such as processing steps 600 in FIG. 6.

Figure 9:
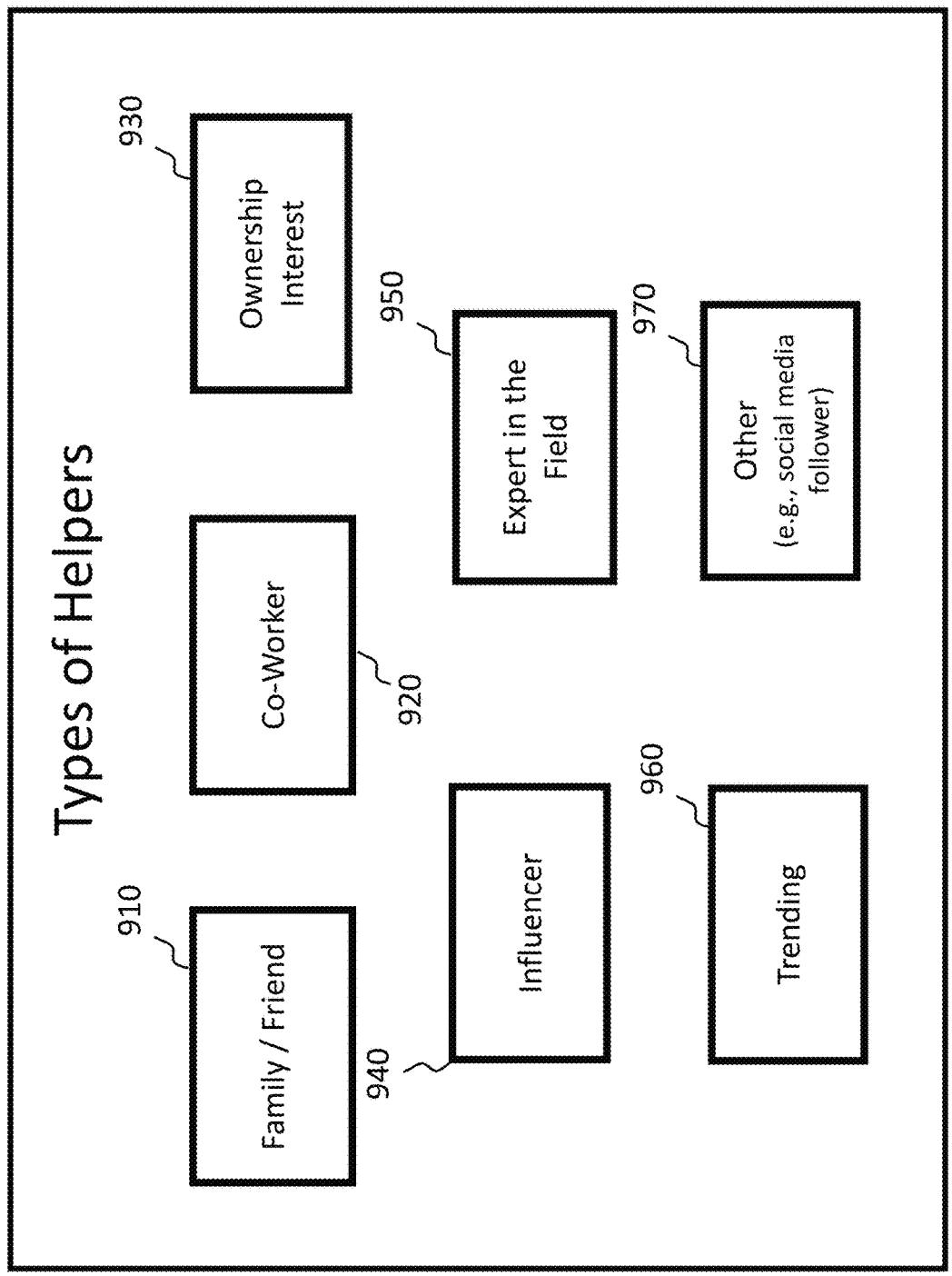
FIG. 9 is a block diagram of types of helpers, in accordance with some embodiments of the disclosure.

FIG. 9 is a block diagram 900 of types of helpers, in accordance with some embodiments of the disclosure. The block diagram depicts various types of user-helper relationships, or lack thereof, and the relationships are used to determine whether to track or not track the helper.

In one embodiment, at block 910, the user-helper relationship may be that they are related to each other, such as a family member, or first- or second-degree friends. The relationship may be determined by the control circuitry 228 by utilizing a variety of methods. For example, the system, through control circuitry 228, may access social network sites; the user's phone or other directory of contacts; or past texts, chats or other messages between the user and the helper, to name a few, to gather information that may lead to determining their relationship. Likewise, the system may also determine whether the user and helper are friends, and if so, if they are connected on a first- or second-degree basis on social media platforms. Determining that the user and helper are closely associated, such as by determining that they are relatives or friends, allows the system to automatically track the helper based on the relationship. This is because if the user is discussing an item of need, such as the problem of incurring pain while running and seeking solutions for the pain from a closely associated person, then it is likely that they are open to advice and suggestion from the person based on their relationship. As such, the system may either automatically track the helper without performing any additional analysis on the helper or reduce the amount of analysis to be performed on the helper in order to determine whether to track them.

Block 920 depicts a co-worker relationship between the user and helper. The co-worker relationship between the user and helper may be determined by the system by utilizing a variety of methods. For example, the system may access a job-related website, such as LinkedIn® or a company's internal database, to determine if a co-worker relationship exists. The system may also access the user's email, texts, and other accounts to analyze any prior communications between the user and helper to determine if a co-working relationship exists.

Information leading to the identification of the co-working relationship may be used by the system to automatically determine to track the helper, since the helper is likely of benefit to the user based on the working relationship. This may be especially true if the topic of conversation between the user and helper relates to products and services that are associated with or can be associated with the workplace environment. Other products and services not related to the workplace environment may also be used to track the helper since the system has determined there is some form of relationship between the user and helper. As such, the user discussing any product or service, or the context of the conversation being associated with a product or service, such as the foot-hurting-while-running example of block 1 in FIG. 1, may be recognized by the system as a co-worker reaching out to another co-worker to get their opinion. Thus, the helper co-worker should be tracked, as they may have insights into the user based on their working relationship and provide insightful recommendations that may have been missed if their knowledge was not leveraged. Although a co-worker example has been taken, any of the other relationships of FIG. 9 may also be recognized by the system as an important relationship, if one exists. The helper, based on such a relationship, should be tracked to get insightful recommendations that may have been missed if their knowledge was not leveraged.

In one embodiment, at block 930, the system may determine that the helper currently owns or has owned or used the product or service of interest to the user that was discussed in their user-helper conversation. For example, if the discussion between the user and helper relates to electric vehicles, and the helper currently owns a Tesla or has owned one in the past, then the system may determine the helper qualified to provide advice on electric cars to the user.

To determine whether the helper currently owns or has owned an electric vehicle in the past, the system, through the control circuitry 228, may analyze the conversation between the user and helper to ascertain such information. The system may also access a variety of accounts held by the helper and analyze information posted on such accounts to determine if the helper currently owns or in the past has owned an electric vehicle. The system may also obtain access to public records to determine if the helper currently owns or in the past has owned an electric vehicle. For example, the system may access a driver motor vehicle (DMV) database to find car registrations associated with the helper in order to determine if the helper currently owns or in the past has owned an electric vehicle. If a determination is made that the owner currently owns or in the past has owned an electric vehicle, then the system may automatically track the helper in order to get their insights relating to electric vehicles such that those insights may be used in selecting supplemental content that could be sent to the user.

In one embodiment, at blocks 940 and 950, the system may determine that the helper is an expert in the field or an influencer on social media associated with products or services that were part of the discussion between the user and the helper. For example, if the discussion between the user and helper relates to the user's foot hurting while running as in the example of block 1 in FIG. 1, and the helper is either a chiropractor, a podiatrist, or an influencer of running shoes on social media, the system may determine the helper qualified to provide advice on the user's problem of experiencing pain while running and gain the helper's insights to select targeted supplemental content for the user.

Similarly, the system may also look at other social media relationships as well to determine if someone is trending, as depicted in block 960, and use that information to track the helper. Although some relationships and associations between a user and helper, or the helper's qualification and status, have been identified in FIG. 9, other helper designations are also contemplated within the embodiments. For example, if a helper is a social media follower, as depicted in block 970, or possesses any other qualification, such as based on their education or job skills, or just knows the user personally, then the helper's insights into a product for the user would be valuable.

FIG. 10 is an example of categories of sharing and privacy settings of a helper that are used in tracking, in accordance with some embodiments of the disclosure. Once a determination has been made to track a helper, prior to tracking the helper's behavior and future interactions, the system may determine whether the helper has preset privacy and sharing settings. Some examples of sharing and privacy settings have been depicted in block diagram 1000. These include no settings at all, no restrictions, do not disclose identity, do not disclose the following list of products, do not disclose identity or products, do not disclose products identified based on helper's work conversations, do not disclose products based on AR/VR (i.e., augmented reality or virtual reality) input, and do not disclose products if the helper intends to buy them for the user.

In one embodiment, at block 1010, the system may determine that the helper does not have any preset settings for sharing or privacy at all. In such circumstances, a machine learning engine may execute a machine learning algorithm to analyze the helper's prior conversations or consumption history to determine if the helper has either restricted, made any comments, or performed any actions that may indicate the helper's sharing and privacy preferences. If such prior data is found, the machine learning algorithm may identify such data so that it can be complied with prior to tracking the helper. In yet another embodiment, the system may display a prompt or some other type of message to the helper asking the helper's permission to disclose their identity or access their future interactions.

Figure 20:
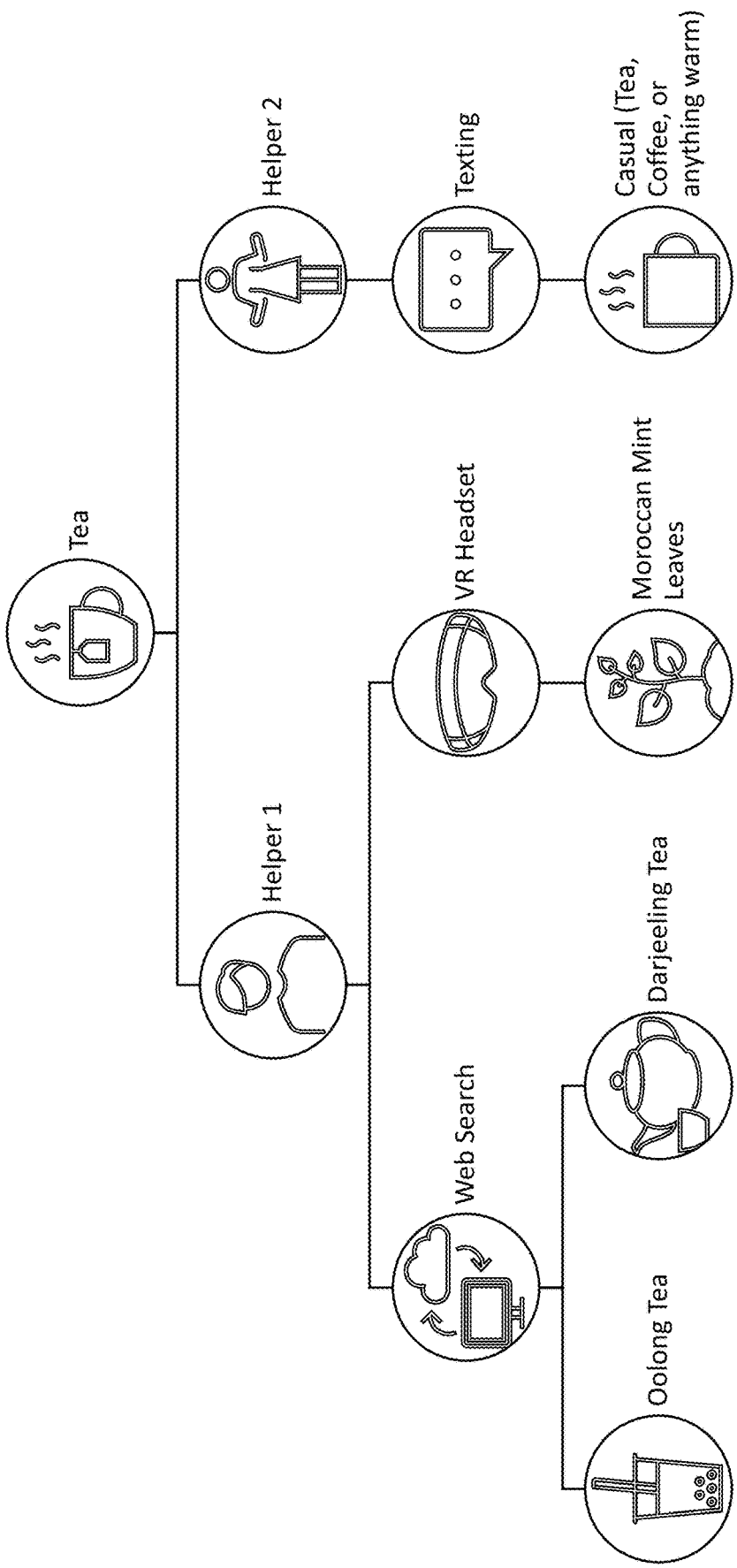
FIGS. 20-21 are examples of a knowledge data structure of products and helpers, in accordance with some embodiments of the disclosure.
Figure 21:
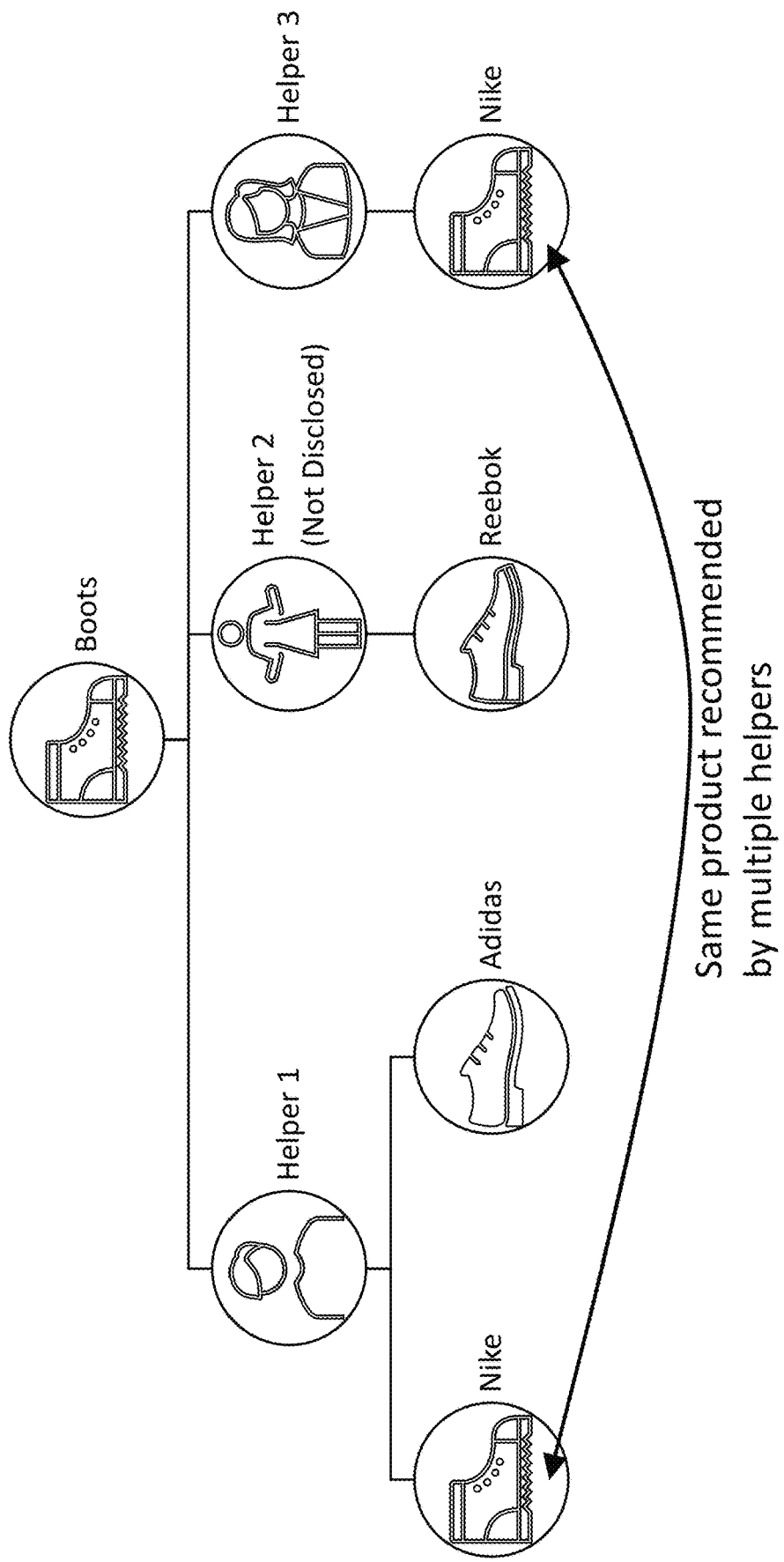

In one embodiment, at block 1020, the system may determine that the helper has no restrictions in their preset setting which may be found by accessing the helper's profile. Accordingly, the system may track the helper and, as described in FIGS. 20-21, provide all tracking-related information including the helper's identity to the user, such as in form of a knowledge tree. Such information may be accessed by the user to determine that a certain piece of supplemental content is being recommended because and identified helper has browsed a certain platform on which the helper found the particular product interesting. Providing such information may incentivize the user to act upon it, such as exploring the product to possibly buy it, as they may value the helper's input.

In one embodiment, at block 1030, the system may determine that the helper does not want their identity shared with the user. If that is the only restriction on the helper's profile, then the system may track the helper and use their insights to select supplemental content that is suitable, or the best supplemental content related to the products, for the user. The system may share with the user information relating to platforms and other information associated with the product, however, based on the helper's preset privacy and sharing preferences, the system may not share the helper's identity.

In one embodiment, at block 1040, the system may determine that the helper's profile includes a preference in their privacy and sharing settings that indicates not to disclose a product if it falls within a list of products that the helper has identified not to share. Accordingly, the system may share the helper's identity, the platforms used by the helper to suggest certain products, and any other information relating to the product, or the helper's future interactions associated with the supplemental content as long as any such products or related supplemental content does not fall within the do-not-disclose list of products from the helper's profile. For example, if the helper has gazed towards any products or services that the helper wants to stay confidential, such as certain medications they are taking or certain divorce lawyers they are speaking to, then the helper may list those on the do-not-share list of products and services.

In one embodiment, at block 1050, the system may determine that the helper's profile includes a preference in the privacy and sharing settings that indicates not to disclose either the products or their identity. In such a situation, since no information may be provided to the user based on the helper's behavior and interactions, including their identity, the system may not track the helper.

In one embodiment, at block 1060, the system may determine that the helper's profile includes a preference in the privacy and sharing settings that indicates not to disclose a product based on the helper's work conversation or any other work-related platforms. Accordingly, the system may share the helper's identity, the platforms used by the helper to suggest certain products, and any other information relating to the product, or the helper's future interactions associated with the supplemental content, as long as any such products or related supplemental content do not relate to the helper's work. For example, the helper may be working for a company that retains products they use as confidential. In such a scenario, if the helper has a conversation with a co-worker, or happens to gaze upon a product or service while in their work environment, or related to work, then the helper may indicate in their profile for such products and services to be held confidential and not to be used as a basis for selecting supplemental content and transmitting it to the user.

In one embodiment, at block 1070, the system may determine that the helper's profile includes a preference in the privacy and sharing settings that indicates not to disclose products or services when the input is received based on virtual, augmented, or mixed reality, or metaverse-related devices. If that is the only restriction in the helper's profile, then the system may track the helper and use their insights to select supplemental content that are suitable, or the best supplemental content related to the products for the user; however, the system may share any products or supplemental content that were based on an input from the helper's virtual, augmented, or mixed reality, or metaverse-related devices. For example, if the helper has gazed towards any products or services while using their AR/VR headset, where they may be in a confidential area or a private area, then such products may not be used as a basis for selecting supplemental content for the user.

In yet another embodiment, at block 1080, the system may determine that the helper's profile includes a preference in the sharing and privacy settings that indicates not to disclose products if the helper intends to buy them for the user. This scenario is further described below in the context of FIGS. 11A-11C.

FIGS. 11A-11C are examples of a communication between a user and helper where the user or helper intends to purchase a product or service for the other, in accordance with some embodiments of the disclosure.

In one embodiment, as depicted in FIG. 11A, the user and helper are engaged in a communication with each other. In this scenario, the user intends to buy a gift for the helper and obtain information from the helper without disclosing to the helper their intention. Basically, the user wants to surprise the helper with a gift but wants to gather some insights from the helper to determine their likes and dislikes.

The system, through control circuitry 228, may utilize a variety of engines, such as a machine learning engine and an artificial intelligence engine to analyze their conversation as well as analyze data relating to the helper to determine whether the user intends to buy a gift for the helper. For example, the system, through control circuitry 228, may determine that the user has bought a gift for the helper around the same time a year prior. The system may also determine that an event related to the helper is coming up, such as their birthday, anniversary, or some other occasion. The system may tap into the helper's accounts and databases to obtain such information. The system may also tap into the user's accounts to obtain data, such as web browsing searches or saved shopping carts, to determine if the user intends to buy a gift. The artificial intelligence engine may piece all the information together to make a determination whether the user intends to buy a gift for the helper. In another embodiment, the system may send a message directly to the user asking them whether they intend to buy a gift for the helper and intend to keep that confidential. A similar but opposite scenario may be applied when the helper intends to buy a gift or the user and wants to keep it confidential, as depicted in FIG. 11B.

As depicted in FIG. 11C, a determination is made by the system that either the helper or the user intends to buy a gift for the other and would like to keep it confidential. In such a case, the system automatically invokes certain confidentiality and privacy settings such that the data from one entity or another can be used by the system to suggest products and select supplemental content without disclosing the identity of the other or where such recommendation was derived, i.e., not sharing the source of the data.

Figure 12:
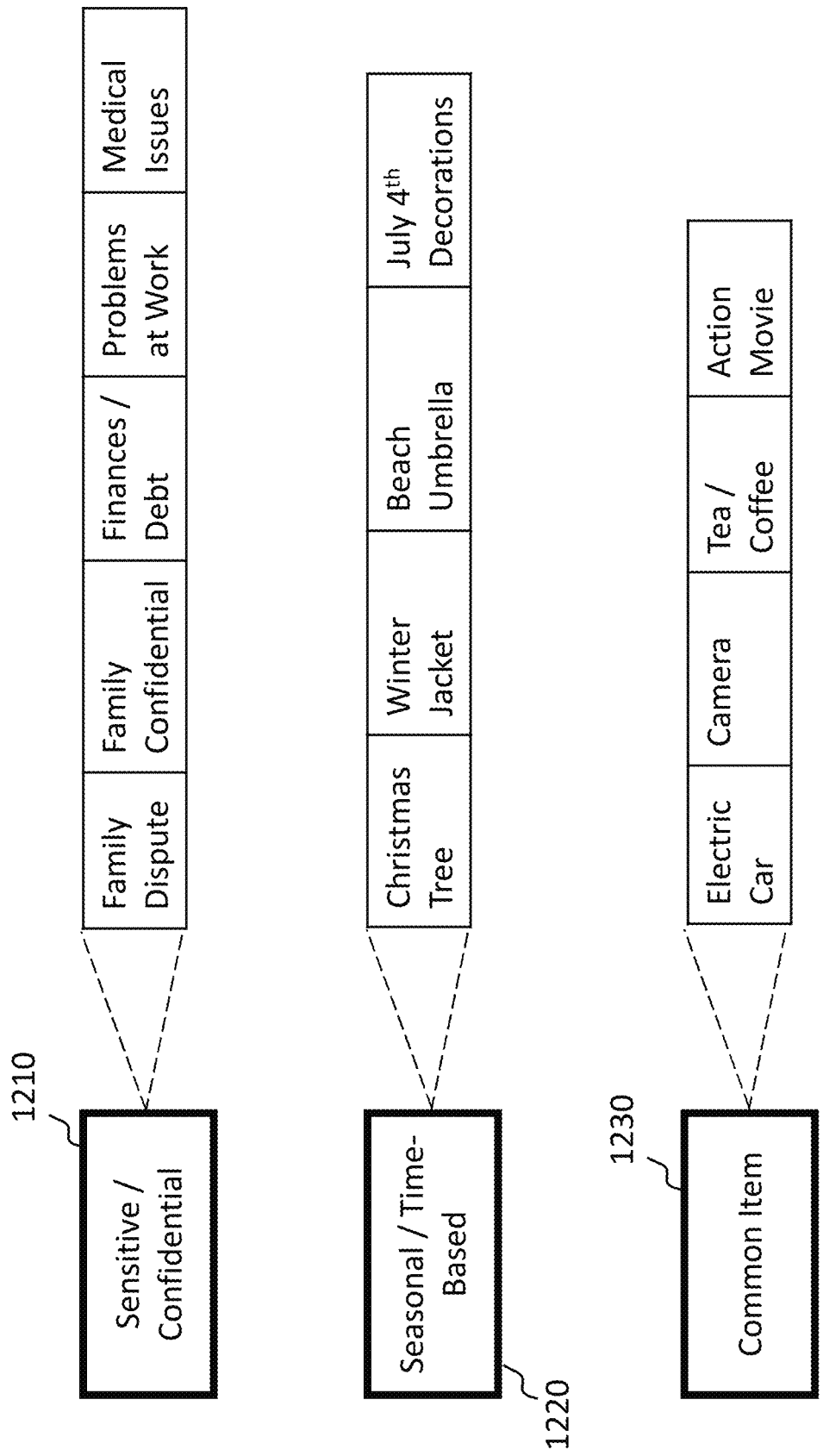
FIG. 12 is a block diagram of sensitive and common genres for tracking, in accordance with some embodiments of the disclosure.

FIG. 12 is a block diagram of a variety of genres for tracking, in accordance with some embodiments of the disclosure. In some embodiments, based on the context of the conversation and the genre, the products may be bucketed into categories. For example, these categories, as depicted in FIG. 12, include sensitive or confidential category 1210, seasonal or time-based category 1220, and common item category 1230.

In one embodiment sensitive or confidential category 1210 may include topics related to, for example, family disputes, family confidential matters, finances and debt, problems at work, and medical issues. These are just some examples of categories that are commonly sensitive or confidential to people, however, other categories that are commonly considered confidential are also contemplated.

If a helper does not select a sharing and privacy preference in their profile, as described in FIG. 10, then the system may determine the context of the conversation between the helper and automatically select a category from the categories 1210-1230 and assign it to the conversation. The system may then select a sharing or privacy setting for each separate category.

In one embodiment, if the category assigned to the conversation is the sensitive and confidential category, then the system, through control circuitry 228, may assign a privacy and sharing setting that does not allow the system to share the helper's behavior, future interactions, or identity. For example, if the topic of the conversation is some family dispute, and the helper is going through therapy or counseling or seeing a divorce lawyer, then the helper likely would not want to share any products or services, such as names of therapist services or divorce lawyers services, or medication taken for therapy or depression, with the user. Similar, if the topic of conversation relates to finances, and in the background the helper is going through financial troubles seeking debt resolution and working with agencies to resolve their credit, then the helper may not want to share their behavior and future interactions that relate to products such as credit counseling, debt resolution, and other related products and services, with the user.

In one embodiment, if the category assigned to the conversation is the seasonal or time-based category, then the system may assign a sharing setting that does allow the system to share the helper's behavior, future interactions, or identity, as long as the products related are identified within a specific time frame. For example, if the category is seasonal or time-based, and the conversation relates to a birthday, or an office party scheduled on a specific date or any event, such as Christmas, then the system may track the helper's behavior and future interactions and select supplemental content related to those interactions for transmitting to the user as long as the helper's interactions are prior to the occurrence of the event, such as the birthday.

In one embodiment, the system may automatically assign the sharing or privacy setting based on the category 1210-1230 of the conversation. in another embodiment, the system may provide a prompt to the helper allowing them to select whether to disclose or not to disclose certain future interactions and/or their identity. The system may also provide recommendations for sharing and privacy options to select based on their past behavior related to sharing.

FIG. 13 is a block diagram 1300 of various tracking platforms and associated inputs, in accordance with some embodiments of the disclosure. In some embodiments, inputs relating to the helper's behavior and interactions after their conversation with the user are obtained from the platforms 1310-1370. These platforms include internet 1310, social media 1320, digital assistant 1330, AR/VR 1340, mobile phone (voice input) 1350, SMS 1360, and email 1370.

In one embodiment, the system, through control circuitry 228, tracks the helper's web browsing on the internet 1310. The system determines whether any product or service browsed on the internet by the helper is of interest to the helper. The system may apply any of the interest-detecting factors mentioned in FIG. 8 to determine the helper's interest.

Likewise, the system tracks the helper's interaction on social media platforms 1320. Accordingly, the system determines whether any product or service viewed on social media, or any product or service posted or commented upon on social media by the helper can be associated with helper's interest in the product or service. For example, if the helper has posted positive comments on a particular product that was posted on social media, the system may associate such positive comments with the helper's interest in the product and select supplemental content relating to the product for transmitting to the user. The system may apply any of the interest detecting factors mentioned in FIG. 8 to determine the helper's interest while browsing, posting, or commenting on social media.

In another embodiment, as depicted in block 1330, the system tracks the helper's interactions with a digital assistant. This includes both the helper's speech input into the digital assistant as well as the response from the digital assistant back to the helper. The system may use NLP and AI engines and algorithms to determine interest based on the helper-digital assistant interaction. The system may also apply any of the interest-detecting factors mentioned in FIG. 8 to determine the helper's interest.

In another embodiment, the system tracks the helper's virtual, augmented, or mixed reality inputs 1340 to determine whether any product or service, whether virtually displayed or in a real-life view through a virtual, augmented, or mixed reality device is of interest to the helper. The system may apply any of the interest detecting factors mentioned in FIG. 8 to determine the helper's interest.

In yet another embodiment, the system tracks the helper's mobile phone 1350 for inputs of any speech by the helper determine whether any voice input can be associated with a product or service that can be associated with helper's interest. The system may use NLP and AI engines and algorithms to determine interest. The system may also apply any of the interest-detecting factors mentioned in FIG. 8 to determine the helper's interest.

In another embodiment, the system tracks the helper's SMS 1360 or emails 1370 to determine whether any product or service mentioned in the SMS or emails can be associated with the helper's interest.

In the platforms 1300 used for input described above in FIG. 13, the system may apply any of the interest-detecting factors mentioned in FIG. 8 to determine the helper's interest. The system may also invoke NLP, ML, or AI engines and execute algorithms to determine the helper's interest. Once interest is determined, the system may use the interest in the product to select supplemental content relating to the product for transmitting to the user.

FIG. 14 is a block diagram 1400 of time frames to track a helper, in accordance with some embodiments of the disclosure. In one embodiment, the system may track the helper's behavior and future interactions for predetermined time, as depicted in block 1410. The predetermined time period may be set by the user or automatically set by the system.

In one embodiment, as depicted in block 1420, the system may allow the helper an option to stop tracking at any desired time. Once the helper selects the stop tracking option, the system may stop tracking the helper and use data prior to the time when the stop tracking was selected.

In one embodiment, as depicted in block 1430, the system may track multiple helpers at a time. Once any one of the helpers' inputs is used for transmitting supplemental content to the user, the system may stop tracking all other helpers.

In one embodiment, as depicted in block 1440, the system may determine that a conversation between the user and helper relates to an upcoming event on a specific date. Accordingly, the system may track the helper until the occurrence of the event and then stop tracking the helper.

In one embodiment, as depicted in block 1450, the system may determine that user is no longer interested in the product or service discussed during the conversation between the user and helper. For example, the user may have already bought another product, or the user may not have a need for the product anymore. The system may access the user's financial data, such as credit cards and bank accounts, and other data relating to the user's behavior to determine whether the user has either bought the product or is no longer interested in the product. Accordingly, the system may stop tracking the helper if such a determination is made.

In one embodiment, as depicted in block 1460, the system may determine that the helper has not engaged in any behavior or interactions that relate to a product or service discussed during the conversation between the user and helper for a predetermined amount of time. For example, if the topic of conversation between the user and helper relates to a shoe, the system may track the helper for a period of one month, or any other predefined period, and then stop tracking if the helper has not engaged in any activities using any of the platforms listed in FIG. 13 that relate to a shoe.

FIG. 15 is a block diagram 1500 of examples of user preferences for supplemental content, in accordance with some embodiments of the disclosure. In one embodiment, the user may set preferences for supplemental content that the user wishes to receive in their profile. In another embodiment, the system may invoke a machine learning engine to execute a machine learning algorithm for determining preferences of types of ads based on user's historical data. These preferences may include, as depicted in block 1510, supplemental content that are selected based on tracking only of helpers who are family members or friends. As such, the system may only use behavioral and interaction data from helpers that are family members or friends of the user to select supplemental content.

In another embodiment, the user may set a preference, as depicted in block 1520, for supplemental content related to the products or services that are selected based on a predefined budget. As such, the system may only track those products and services that are within the user's predefined budget.

In another embodiment, the user may set a preference for supplemental content related to the products that may include, as depicted in block 1530, products that are within a region or distance from the location of the user. In this scenario, supplemental content related to products in physical stores may be limited to only those physical stores that are within a defined distance from the user's home or work location as presented by the user. As such, the system may access the user's GPS data to filter and exclude any supplemental content related to the products in physical stores that are beyond the defined distance.

In another embodiment, the user may set a preference for products and related supplemental content which may include, as depicted in block 1540, by not wanting any products that are from foreign countries or certain specific products 1560 that the user dislikes. The user may also set preferences, as depicted in blocks 1550, 1570, and 1580 respectively, for products and supplemental content only if the product has a return policy as defined by the user, for a product that is from a defined brand name, or for a product that is currently on sale. Although some examples of preferences for products are listed in FIG. 15, the user may set any other preferences in their profile as desired to include or exclude products and services.

Figure 16:
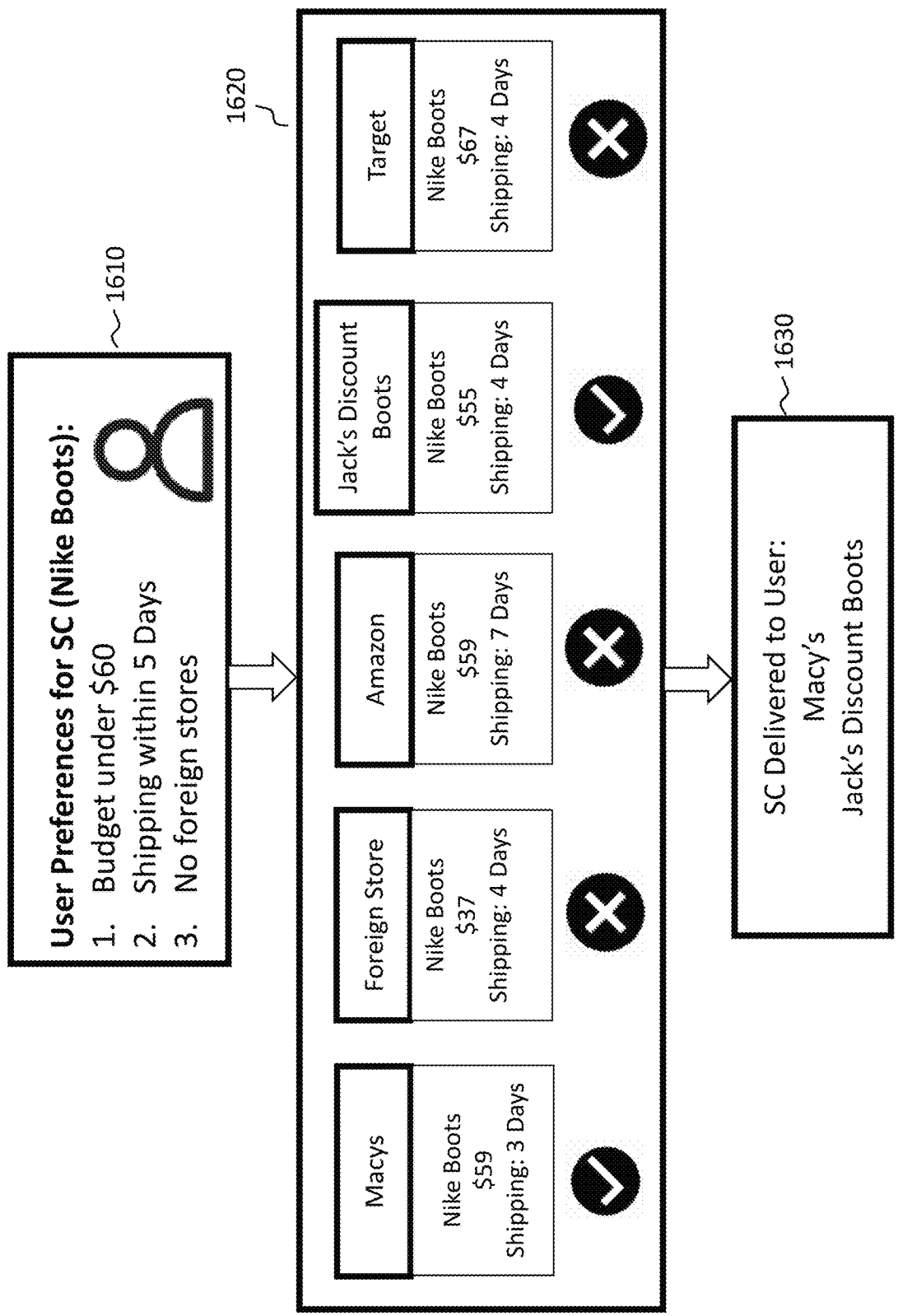
FIG. 16 is process for using user preferences to filter supplemental content, in accordance with some embodiments of the disclosure.

FIG. 16 is process for using preferences set by a user to filter supplemental content, in accordance with some embodiments of the disclosure. In one embodiment, as depicted at block 1610, a user sets their preferences for the types of products for which they wish to receive related supplemental content. In this embodiment, this user has set a budget of under $60, shipping out within five days and products that are locally sold and not sold by any stores in foreign countries.

Figure 17:
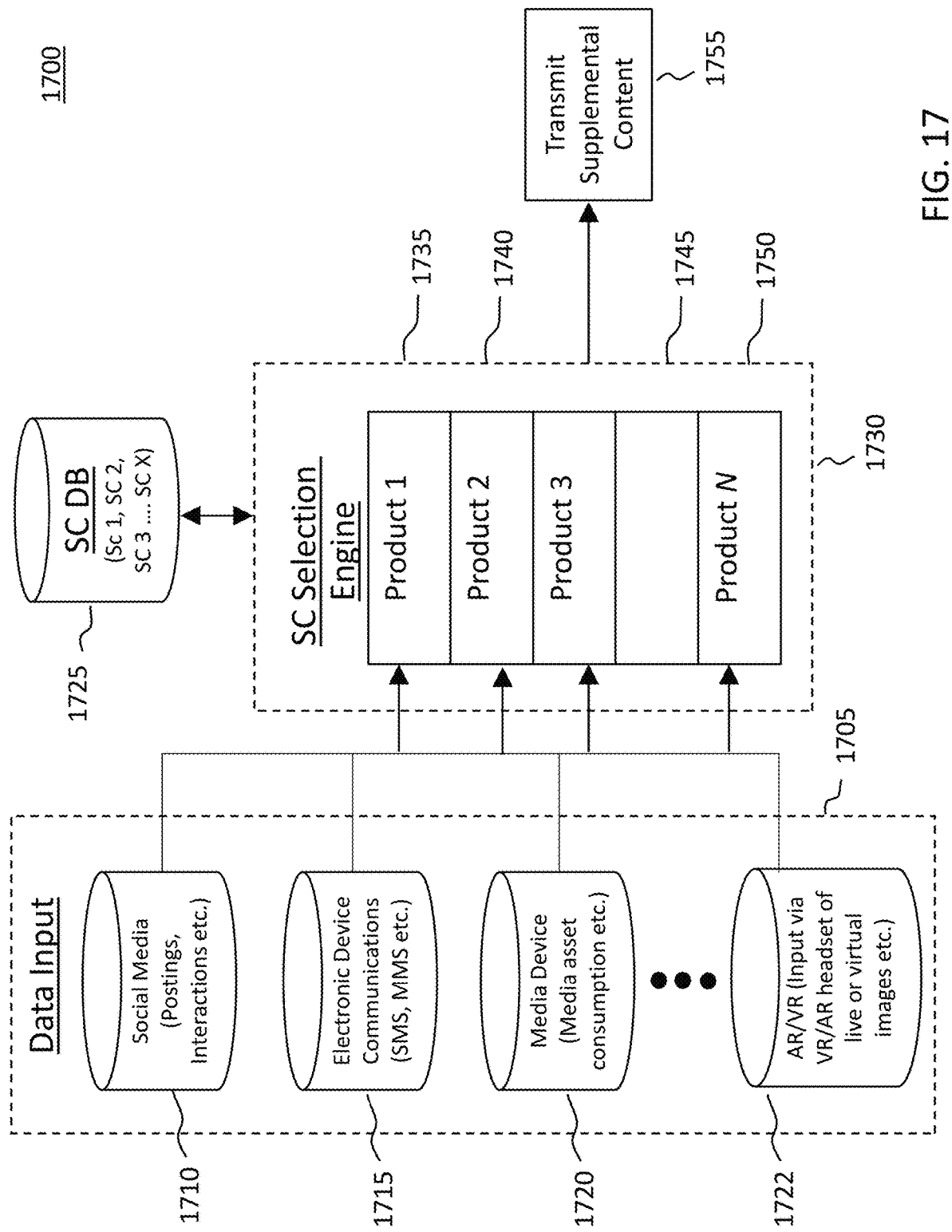
FIG. 17 is a diagram of information flow into a supplemental content selection engine to select supplemental content for transmitting to the user, in accordance with some embodiments of the disclosure.

In one embodiment, applying these preferences, the system may execute the processes described in FIG. 6 and FIG. 21, to identify products that are of interest to the user. As depicted in FIG. 17, the system may use inputs from a variety of data inputs, such as social media 1710, electronic device communication 1715, media device 1720, and an AR/VR input 1722 to determine the helper's interest in products. The supplemental content selection engine 1730 may identify products based on the data inputs derived from the helper's interactions. The supplemental content selection engine may access the supplemental content (SC) database 1725 to determine if ads for the identified products are available. Referring back to FIG. 16, in one embodiment, the ads available are depicted in block 1620. The system may then apply the user preferences of 1610 to ads that are available in 1620 and then transmit a selected ad, as displayed in 1630 as well as in 1755 of FIG. 17, to the user.

FIGS. 18 and 19 are examples of discussion between a user and helper and the system's supplemental content recommendations based on the discussion, in accordance with some embodiments of the disclosure. As depicted in FIGS. 18 and 19, a conversation between a user and helper and the actions performed by the user, helper, and the system are described.

In FIG. 18, a daughter and father are discussing types of teas, and after the conversation, the father has searched for teas using the internet. The system determines that the father is interested in a special type of tea, called "Oolong tea," and uses that data to select supplemental content and present it to the daughter.

In FIG. 19, Felix and Walter are discussing electric vehicles. The system detects that Walter shows interest in a BMW plug-in hybrid X5SUV and expresses his excitement for the vehicle. The system captures his excitement, such as through a microphone of a mobile device, a virtual reality headset, or any other device that Walter may be using at the time. The system then applies the processes of FIG. 6 to select and transmit supplemental content for the BMW plug-in hybrid X5SUV electric vehicle to Felix.

FIGS. 20 and 21 are examples of a knowledge data structure of products and helpers, in accordance with some embodiments of the disclosure. In one embodiment, depending on the privacy and sharing preferences set by the helper, as described in relation to FIG. 10 above, the system may provide to the user a knowledge tree of the details behind suggestion of each piece of supplemental content. These may include identity of the helper whose behavior and future interactions were used, the platforms used by the helper, the products identified as of interest to the helper, and the types of ads selected. In some embodiments, as depicted in FIG. 20, the identity of all the helpers may be disclosed while in other embodiment, as depicted in FIG. 21, the helper's identity, such as helper 2, may be hidden, and their products of interest may be disclosed in the knowledge tree. Disclosing or hiding the helper's identity may depend upon the helper's preferences whether to disclose their identity to the user. The system may also identify if more than one helper has suggested the same product, such as helper one and helper three both suggesting the Nike product in FIG. 21. In such circumstances when multiple helpers suggest the same product, the system may highlight, color, shade, or display it as such so that the user can visually distinguish when multiple helpers are suggesting the same product thereby giving the user more confidence in purchasing the suggested product. Providing a knowledge tree may help a user understand the background and reasoning as to why a particular product is being advertised to them, thereby increasing their likelihood of acting upon and likely purchasing the advertised product.

It will be apparent to those of ordinary skill in the art that methods involved in the above-mentioned embodiments may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving an input of a communication between a first user and a second user, wherein the input of the communication is captured by a microphone associated with an electronic device of the first user and is received by a server from the electronic device;
   automatically determining, by the server, that the communication relates to a first subject matter that is of interest to the first user;
   analyzing, by the server, interactions of the second user that are external to interactions between the first user and the second user, subsequent to receiving of the communication between the first user and the second user, to identify a second subject matter that is of interest to the first user and related to the first subject matter, wherein a sharing setting of the second user is determined prior to analyzing the interactions of the second user; and
   causing display, by the server, on the electronic device associated with the first user, supplemental content related to the second subject matter without disclosing to the first user that the supplemental content is being recommended to the first user based on the interactions of the second user.

2. The method of claim 1, further comprising, in response to determining that the communication does not relate to subject matter that is of interest to the first user, monitoring the communication between the first user and the second user until the communication relates to the first subject matter is identified.

3. The method of claim 1, further comprising, determining whether to track the interactions of the second user based on one or more of a) first user-second user relationship, b) second user's background, c) second user's ownership of a service or product related to the first subject matter, d)

second user's knowledge e) second user's user profile, f) second user's education degree, or g) second user's reputation.

4. The method of claim 1, wherein the sharing setting includes one of: a) do not share, b) share identity of the second user but do not share interactions, c) share only those interactions permitted by the second user, or d) share interaction but not the identity of the second user.

5. The method of claim 1, wherein the interactions of the second user includes one or more of a) Internet browsing, b) social media interactions, c) interactions with digital assistants, d) interaction using a virtual, augmented, or mixed reality device, e) interaction using mobile SMS, f) interactions relating to consumption of media assets; g) verbal interactions, h) email interactions, or i) gestures captured by a camera.

6. The method of claim 5, further comprising:
monitoring the Internet browsing of the second user;
monitoring a gaze of the second user while the second user is browsing the Internet; and
determining that the display of the second subject matter displayed from the Internet browsing is of interest to the second user based on the gaze of the second towards the second subject matter.

7. The method of claim 1, wherein the interactions of the second user are via a virtual, augmented, or mixed reality device.

8. The method of claim 7, further comprising:
receiving an input via the virtual, augmented, or mixed reality device; and
analyzing the input to determine if the input is related to the second subject matter.

9. The method of claim 1, wherein causing display, on the electronic device associated with the first user, the supplemental content further comprises:
identifying a plurality of supplemental content items relating to the second subject matter; and
selecting one or more supplemental content items, from the plurality of supplemental content items, based on predetermined preferences set by the first user.

10. The method of claim 1, wherein the supplemental content related to the second subject matter is displayed on the electronic device associated with the first user if the supplemental content includes a service or product that is within a predetermined budget.

11. A system comprising:
communications circuitry configured for receiving communications between electronic devices associated with a first user and a second user, wherein the communications are captured by a microphone associated with the electronic device associated with the first user; and
control circuitry configured to:
receive an input of a communication between the first user and the second user;
automatically determining that the communication relates to first subject matter that is of interest to the first user;
analyze interactions of the second user that are external to interactions between the first user and the second user, subsequent to receiving of the communication between the electronic devices associated with the first user and the second user, to identify second subject matter that is of interest to the first user and related to the first subject matter, wherein a sharing setting of the second user is determined prior to analyzing the interactions of the second user; and
cause display, on the electronic device associated with the first user, supplemental content related to the second subject matter without disclosing to the first user that the supplemental content is being recommended to the first user based on the interactions of the second user.

12. The system of claim 11, further comprising, in response to determining that the communication does not relate to subject matter that is of interest to the first user, the control circuitry configured to monitor the communication between the first user and the second user until the communication relates to the first subject matter is identified.

13. The system of claim 11, further comprising, the control circuitry configured to track the interactions of the second user in response to determining that the communication relates to the first subject matter.

14. The system of claim 11, further comprising, the control circuitry configured to determine whether to track the interactions of the second user based on one or more of a) first user-second user relationship, b) second user's background, c) second user's ownership of a service or product related to the first subject matter, d) second user's knowledge e) second user's user profile, f) second user's education degree, or g) second user's reputation.

15. The system of claim 11, wherein the sharing setting includes one of: a) do not share, b) share identity of the second user but do not share interactions, c) share only those interactions permitted by the second user, and d) share interaction but not the identity of the second user.

16. The system of claim 11, wherein the interactions of the second user includes one or more of a) Internet browsing, b) social media interactions, c) interactions with digital assistants, d) interaction using a virtual, augmented, or mixed reality device, e) interaction using mobile SMS, f) interactions relating to consumption of media assets; g) verbal interactions, h) email interactions, or i) gestures captured by a camera.

17. The system of claim 16, further comprising, the control circuitry configured to:
monitor the Internet browsing of the second user;
monitor a gaze of the second user while the second user is browsing the Internet; and
determine that the display of the second subject matter displayed from the Internet browsing is of interest to the second user based on the gaze of the second user towards the second subject matter.

18. The system of claim 11, wherein the interactions of the second user are via a virtual, augmented, or mixed reality device.

19. The system of claim 18, further comprising, the control circuitry configured to:
receive an input via the virtual, augmented, or mixed reality device; and
analyze the input to determine if the input is related to the second subject matter.

20. The system of claim 11, wherein causing display, on the electronic device associated with the first user, the supplemental content further comprises, the control circuitry configured to:
identify a plurality of supplemental content items relating to the second subject matter; and
select one or more supplemental content items, from the plurality of supplemental content items, based on predetermined preferences set by the first user.

* * * * *

UNITED STATES PATENT AND TRADEMARK OFFICE
CERTIFICATE OF CORRECTION

PATENT NO. : 12,461,977 B2  
APPLICATION NO. : 17/871292  
DATED : November 4, 2025  
INVENTOR(S) : Mona Singh Page 1 of 1

It is certified that error appears in the above-identified patent and that said Letters Patent is hereby corrected as shown below:

In the Claims

Claim 11, Column 35, Line 57, delete "to first" and replace with --to a first--

Claim 11, Column 35, Line 62, delete "identify second" and replace with --identify a second--

Signed and Sealed this  
Twenty-seventh Day of January, 2026

John A. Squires  
*Director of the United States Patent and Trademark Office*